United States Patent
Chen et al.

(10) Patent No.: US 10,912,382 B2
(45) Date of Patent: Feb. 9, 2021

(54) SLIDE RAIL ASSEMBLY

(71) Applicants: King Slide Works Co., Ltd., Kaohsiung (TW); King Slide Technology Co., Ltd., Kaohsiung (TW)

(72) Inventors: Ken-Ching Chen, Kaohsiung (TW); Shun-Ho Yang, Kaohsiung (TW); Chien-Li Huang, Kaohsiung (TW); Chun-Chiang Wang, Kaohsiung (TW)

(73) Assignees: King Slide Works Co., Ltd., Kaohsiung (TW); Kino Slide Technology Co., Ltd., Kaohsiung (TW)

( * ) Notice: Subject to any disclaimer, the term of this patent is extended or adjusted under 35 U.S.C. 154(b) by 0 days.

(21) Appl. No.: 16/594,376

(22) Filed: Oct. 7, 2019

(65) Prior Publication Data

US 2021/0007480 A1  Jan. 14, 2021

(30) Foreign Application Priority Data

Jul. 12, 2019  (TW) .............................. 108125008 A

(51) Int. Cl.
  *A47B 88/493* (2017.01)
  *A47B 88/423* (2017.01)
(52) U.S. Cl.
  CPC .......... *A47B 88/493* (2017.01); *A47B 88/423* (2017.01)
(58) Field of Classification Search
  CPC ..... A47B 88/40; A47B 88/423; A47B 88/437; A47B 88/487; A47B 88/493
  USPC ........ 312/330.1, 334.1, 334.7, 334.8, 334.11
  See application file for complete search history.

(56) References Cited

U.S. PATENT DOCUMENTS

| | | | |
|---|---|---|---|
| 3,904,254 A * | 9/1975 | Hagen | F16C 33/40 384/18 |
| 4,537,450 A | 8/1985 | Baxter | |
| 6,254,210 B1 | 7/2001 | Parvin | |
| 6,820,954 B2 | 11/2004 | Judge et al. | |
| 6,851,773 B2 | 2/2005 | Chen et al. | |
| 7,794,029 B2 | 9/2010 | Being et al. | |
| 7,798,583 B2 | 9/2010 | Yang et al. | |
| 9,709,091 B2 | 7/2017 | Chen et al. | |
| 9,992,906 B2 | 6/2018 | Chen et al. | |
| 2008/0129170 A1* | 6/2008 | Peng | A47B 88/493 312/334.44 |

(Continued)

FOREIGN PATENT DOCUMENTS

JP          3063321 U       10/1999

*Primary Examiner* — James O Hansen
(74) *Attorney, Agent, or Firm* — Alan D. Kamrath; Karin L. Williams; Mayer & Williams PC

(57) ABSTRACT

A slide rail assembly includes a first rail, a second rail and a slide assisting device. The first rail is arranged with an engaging part. The slide assisting device is movably mounted between the first rail and the second rail. The slide assisting device includes a main body, a plurality of slide assisting members and a fastening member. The plurality of slide assisting members are arranged on the main body and configured to contact the first rail and the second rail in a rolling manner. The fastening member is movably mounted to the main body. The second rail is movable relative to the first rail from a retracted position to an extension position along a direction. When the second rail is moved from the extension position along the direction, the slide assisting device is engaged with the engaging part of the first rail through the fastening member.

17 Claims, 20 Drawing Sheets

(56) References Cited

U.S. PATENT DOCUMENTS

2008/0197758 A1\* 8/2008 Mushan ............... A47B 88/493
 312/334.1
2017/0254586 A1\* 9/2017 Hwang ................ A47B 88/493

\* cited by examiner

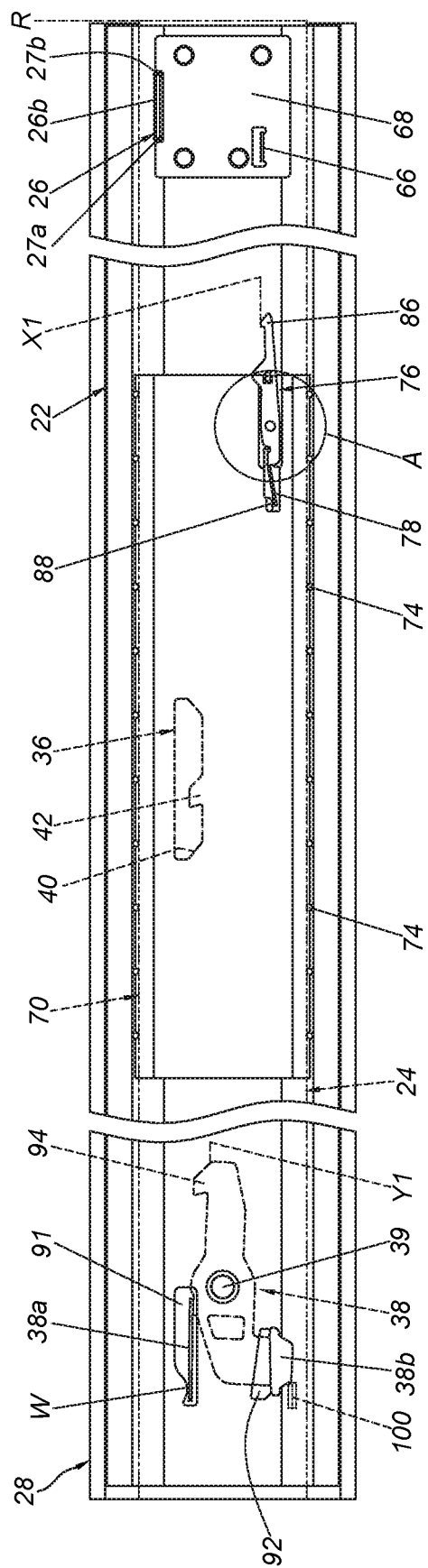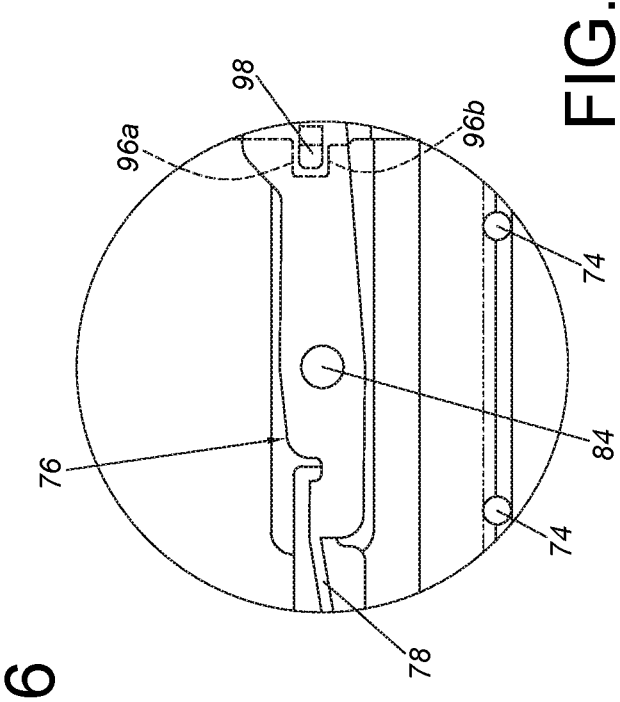

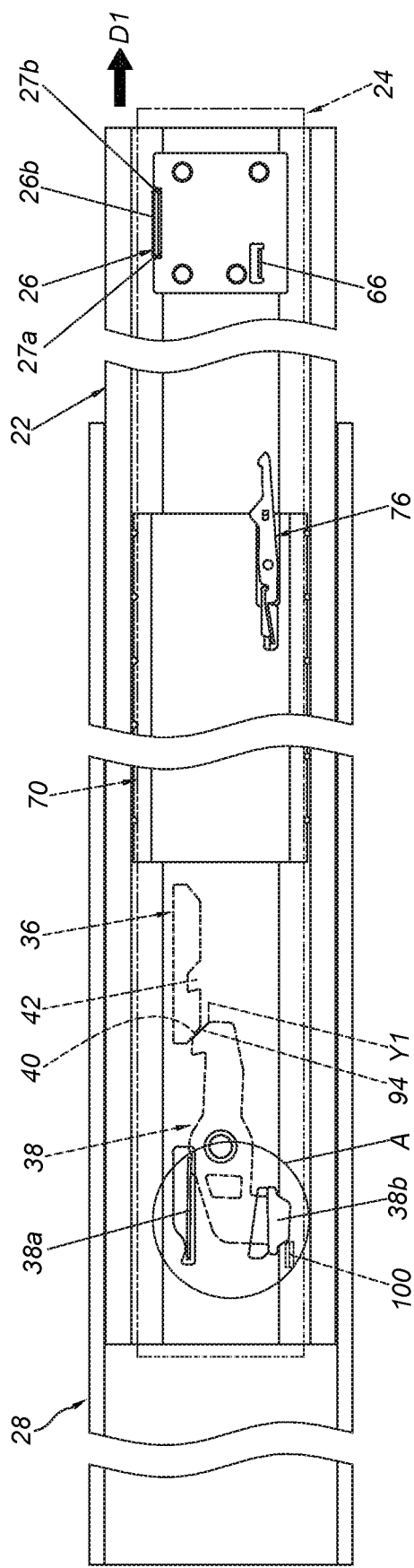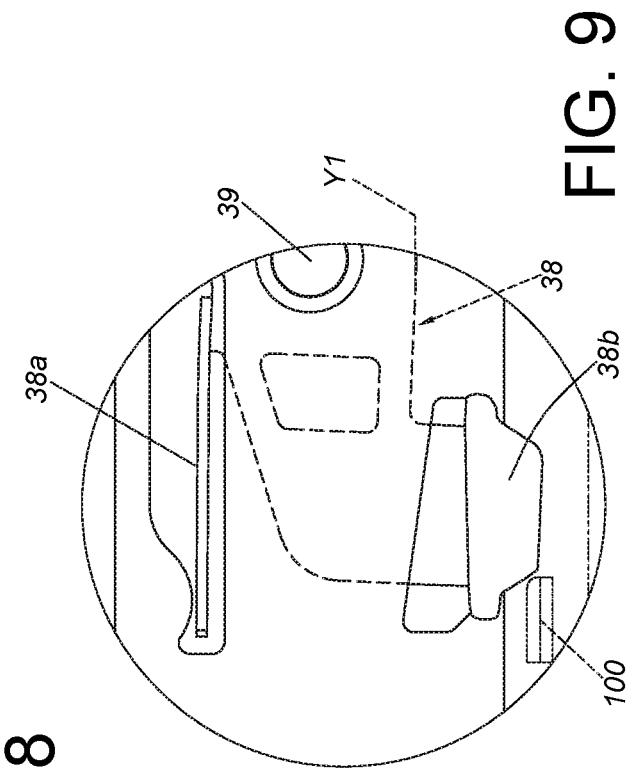
FIG. 8
FIG. 9

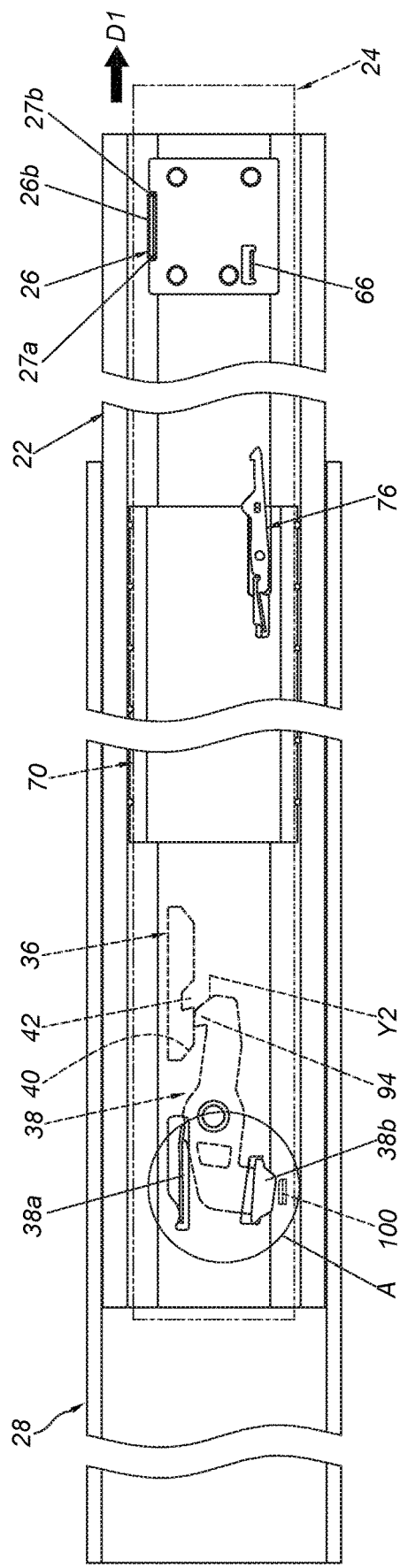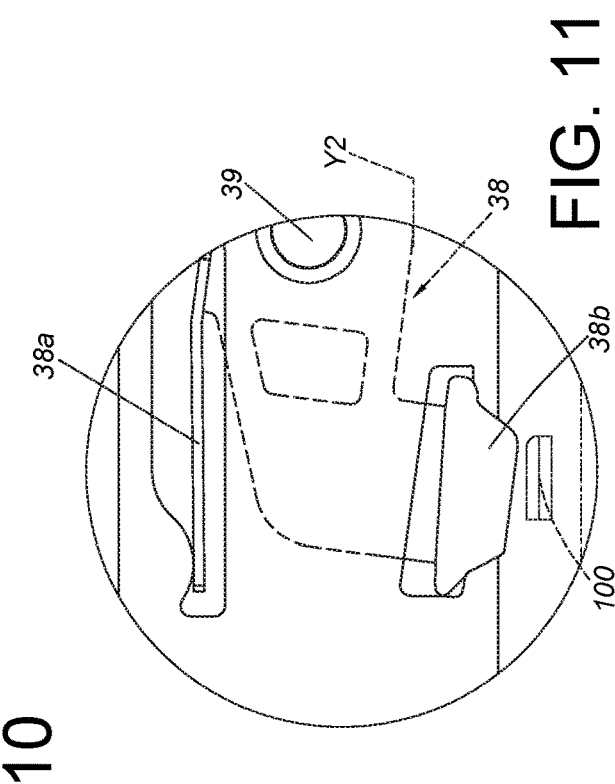
FIG. 10
FIG. 11

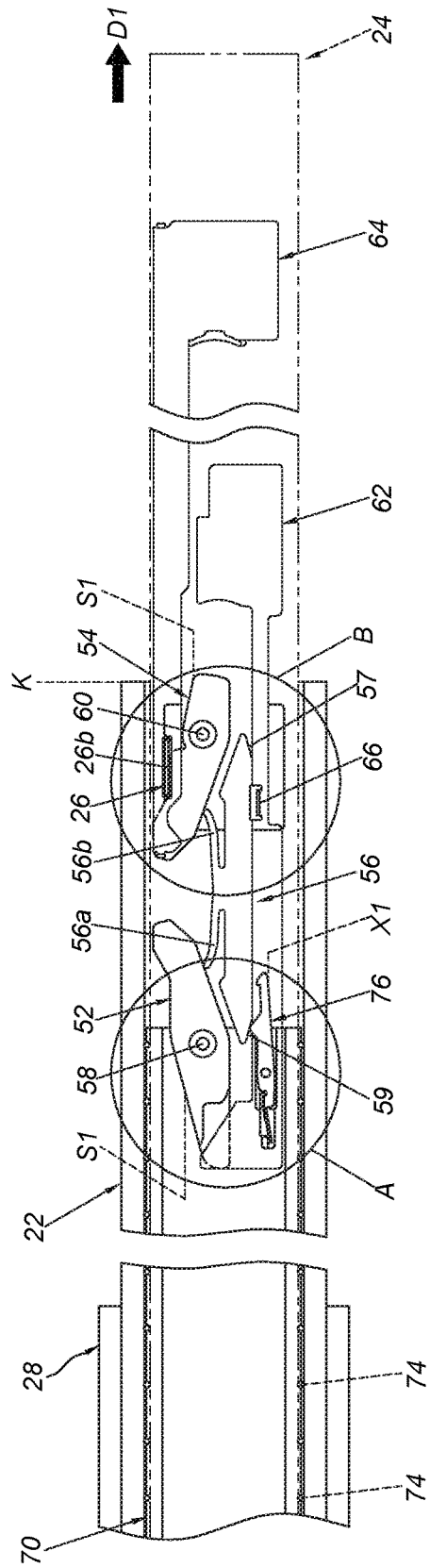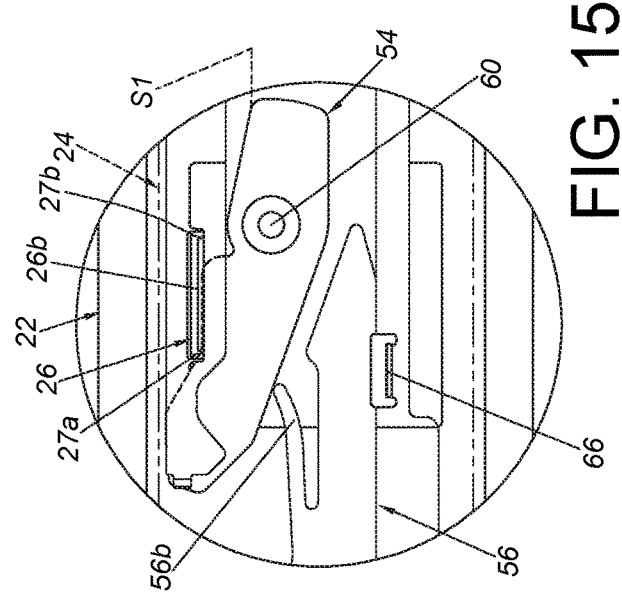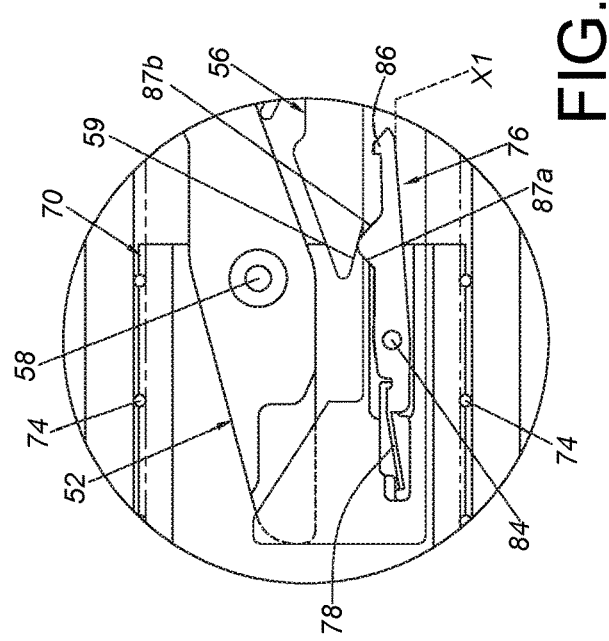
FIG. 13
FIG. 14
FIG. 15

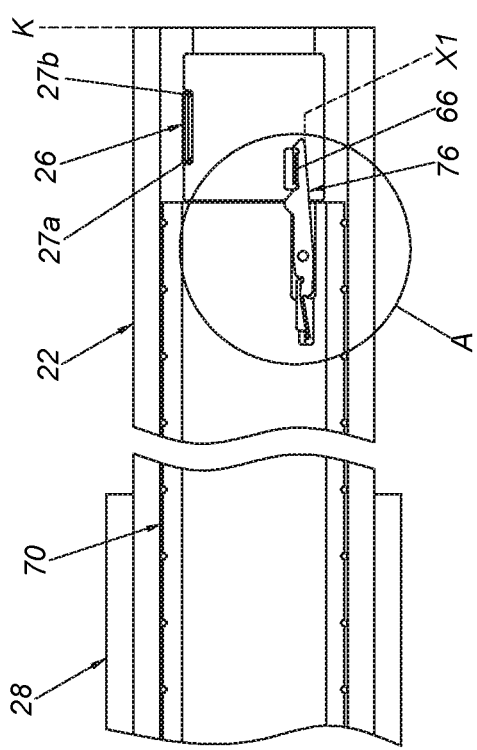

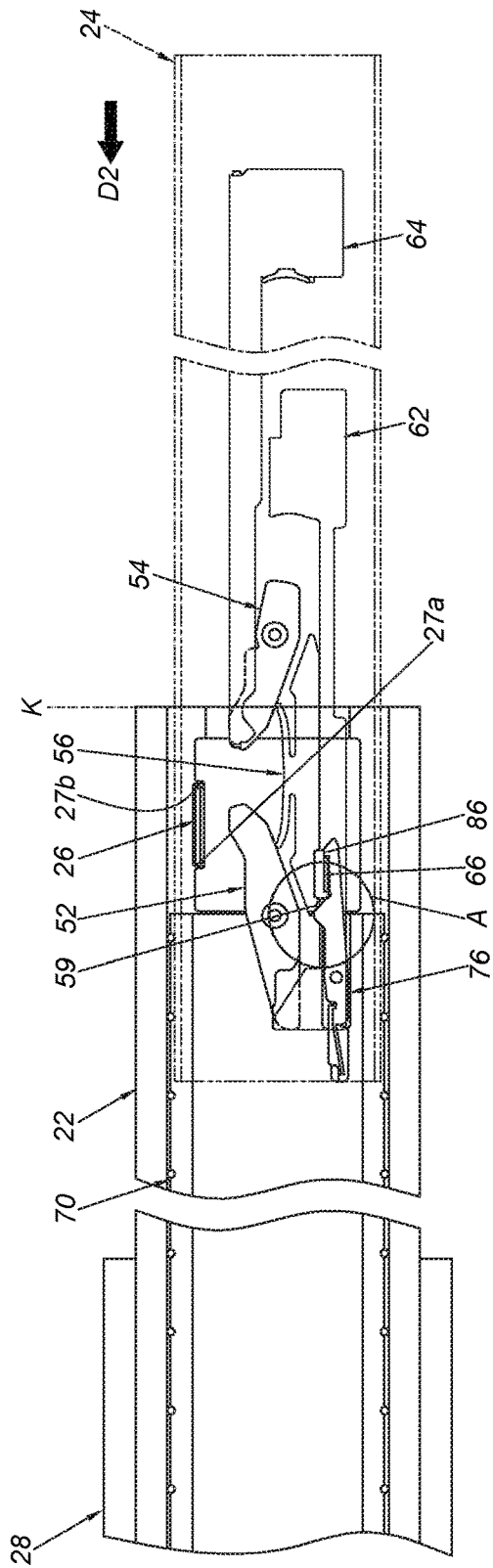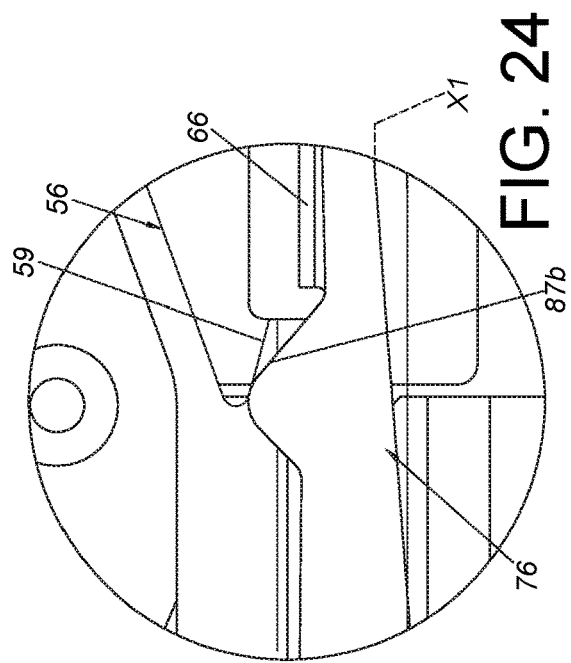
FIG. 23
FIG. 24

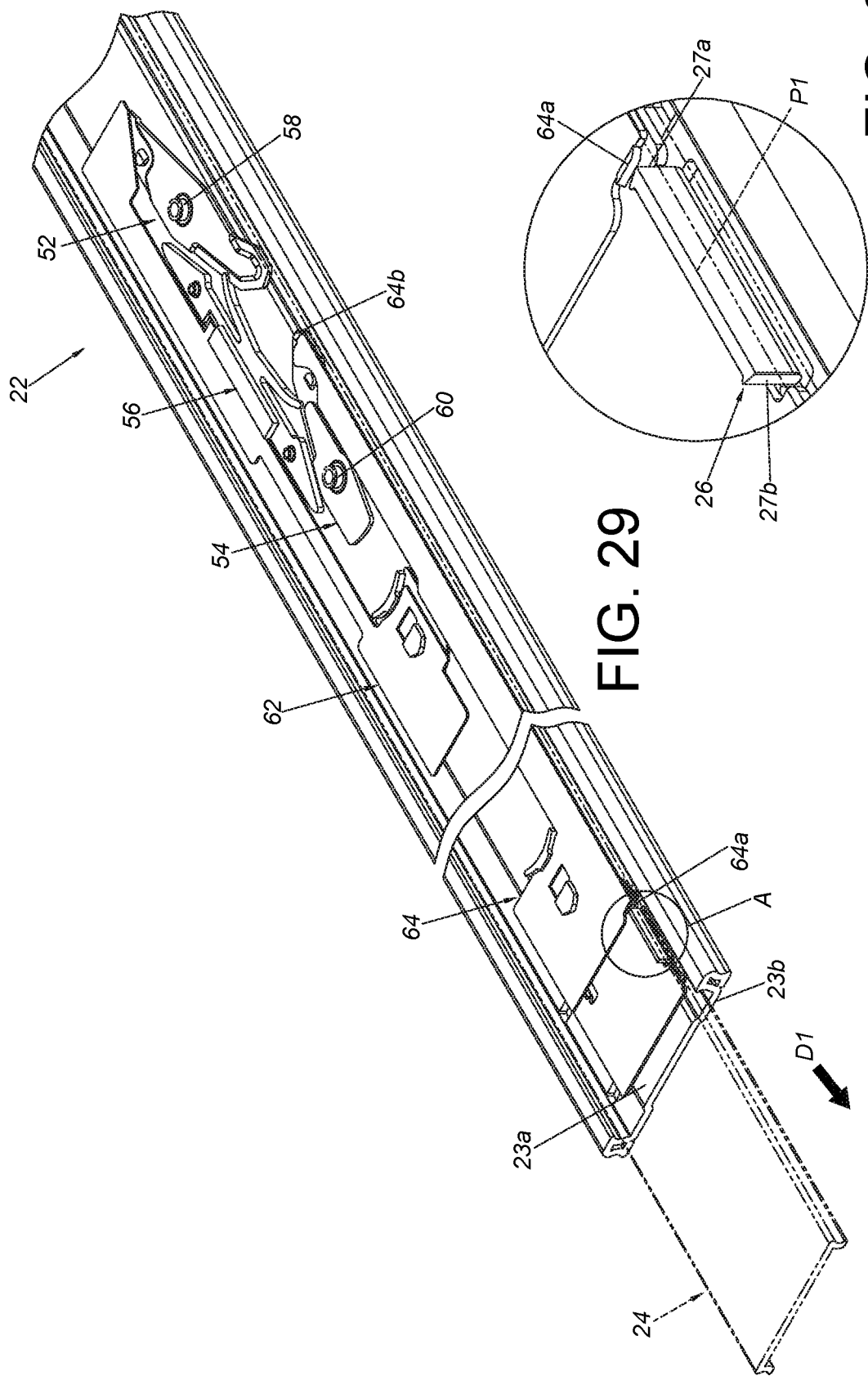

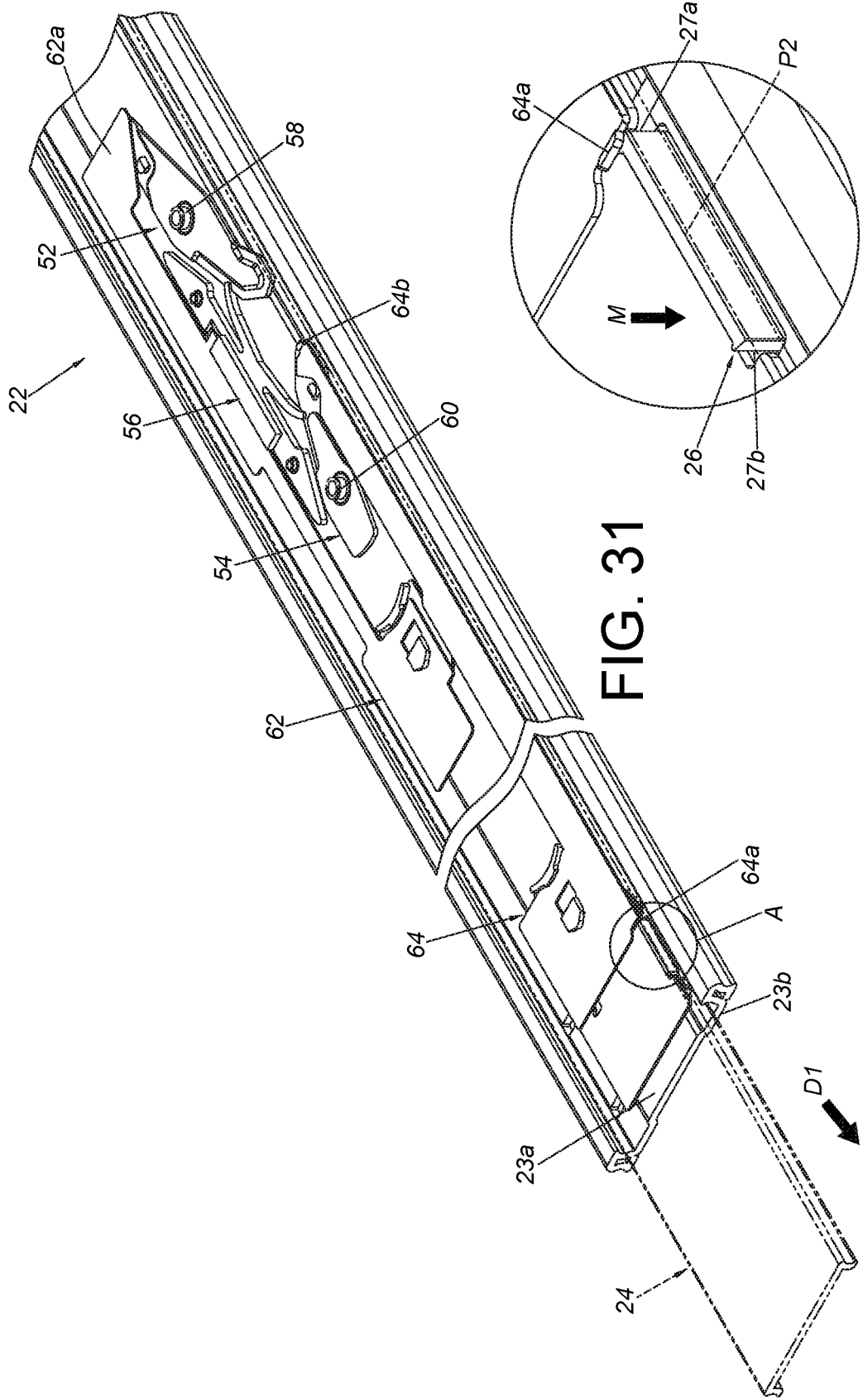

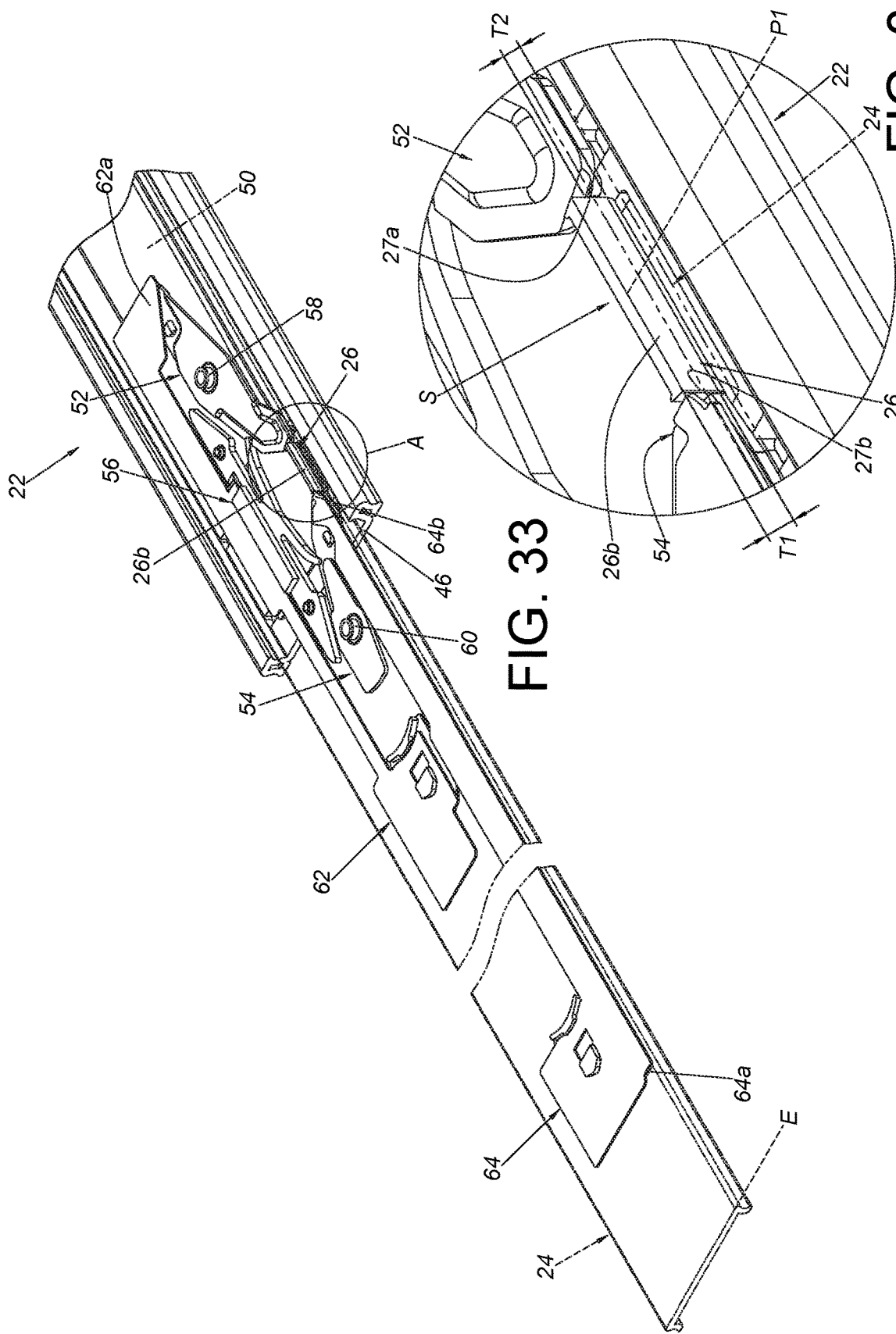

SLIDE RAIL ASSEMBLY

BACKGROUND OF THE INVENTION

1. Field of the Invention

The present invention relates to a slide rail assembly, and more particularly, to a slide rail assembly having a slide assisting device with improved engaging stability.

2. Description of the Prior Art

U.S. Pat. No. 6,851,773 B2 discloses a retaining structure for a slide-aiding member of a slide rail assembly. The slide rail assembly comprises a first rail, a second rail, a slide-aiding member and a retaining member. The second rail is movable relative to the first rail. The slide-aiding member is mounted into a passage of the first rail and configured to improve smoothness of relative movement between the second rail and the first rail. As shown in FIG. 4 of the aforementioned patent, when the second rail is moved relative to the first rail along one direction (such as an open direction) to be detached from the passage of the first rail, the slide-aiding member can be engaged with the retaining member of the first rail through a hook (such as an elastic arm), such that the slide-aiding member can be temporarily held at one position.

Moreover, the elastic arm is fixed to the first rail. However, in current market, a chassis that can be attached to the slide rail assembly is getting larger, such that sizes of slide rails are limited. The slide rails must be designed to become thinner to meet market requirements. However, engaging stability of the aforementioned design of the elastic arm may be affected when the slide rails become smaller or thinner.

SUMMARY OF THE INVENTION

The present invention provides a slide rail assembly with improved engaging stability between internal parts of slide rails.

According to an embodiment of the present invention, a slide rail assembly comprises a first rail, a second rail and a slide assisting device. The first rail is arranged with an engaging part. The second rail is movable relative to the first rail. The slide assisting device is movably mounted between the first rail and the second rail. The slide assisting device comprises a main body, a plurality of slide assisting members and a fastening member. The plurality of slide assisting members are arranged on the main body and configured to rollingly contact the first rail and the second rail. The fastening member is movably mounted to the main body. Wherein, the second rail is movable relative to the first rail from a retracted position to an extension position along a first direction. When the second rail is moved from the extension position along the first direction, the slide assisting device is configured to be engaged with the engaging part of the first rail through the fastening member being in a predetermined state.

Preferably, the slide rail assembly further comprises an elastic feature configured to provide an elastic force to the fastening member in order to hold the fastening member in the predetermined state.

Preferably, the fastening member is pivoted to the main body of the slide assisting device.

Preferably, after the second rail is moved from the extension position along the first direction to be detached from the first rail, the second rail is configured to drive the fastening member to detach from the engaging part of the first rail through a guiding feature during a process of the second rail being moved along a second direction opposite to the first direction to be mounted into the first rail.

Preferably, the slide rail assembly further comprises a blocking member movably arranged on the first rail. When the second rail is located at the extension position relative to the first rail, the second rail is blocked by the blocking member.

Preferably, the slide rail assembly further an elastic member configured to provide an elastic force to the blocking member.

Preferably, the slide rail assembly further comprises a third rail, wherein the first rail is movably mounted between the third rail and the second rail.

Preferably, the third rail is arranged with a functional member, and the first rail is arranged with a synchronization member; wherein when the second rail is moved relative to the first rail from the retracted position along the first direction, the second rail is configured to drive the first rail to synchronously move along the first direction through the synchronization member. A guiding structure of the functional member is configured to move the synchronization member to allow the first rail to be no longer synchronously moved with the second rail when the second rail is moved a predetermined distance from the retracted position along the first direction.

Preferably, the synchronization member is made of a flexible material.

Preferably, the functional member comprises a positioning part, and the synchronization member comprises an engaging section elastically extended toward the third rail. When the first rail is moved relative to the third rail along the first direction to an open position, the first rail is configured to be engaged with the positioning part of the functional member through the engaging section of the synchronization member, in order to hold the first rail at the open position.

Preferably, the synchronization member is pivoted to the first rail.

Preferably, the synchronization member comprises an elastic leg abutting against the first rail.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is a diagram showing the slide rail assembly being in a retracted state according to an embodiment of the present invention;

FIG. 7 is an enlarged view of an area A of FIG. 6;

FIG. 8 is a diagram showing the first rail and a second rail of the slide rail assembly being synchronously moved relative to a third rail along a first direction according to an embodiment of the present invention;

FIG. 9 is an enlarged view of an area A of FIG. 8;

FIG. 10 is a diagram showing the first rail and the second rail of the slide rail assembly being further moved relative to the third rail along the first direction according to an embodiment of the present invention;

FIG. 11 is an enlarged view of an area A of FIG. 10;

FIG. 13 is a diagram showing the first rail of the slide rail assembly being located at the open position relative to the third rail, with the second rail being further moved relative to the first rail along the first direction according to an embodiment of the present invention;

FIG. 14 is an enlarged view of an area A of FIG. 13;

FIG. 15 is an enlarged view of an area B of FIG. 13;

FIG. 21 is a diagram showing the first rail of the slide rail assembly being located at the open position relative to the third rail, with the second rail being detached from the first rail along the first direction according to an embodiment of the present invention;

FIG. 22 is an enlarged view of an area A of FIG. 21;

FIG. 23 is a diagram showing the first rail of the slide rail assembly being located at the open position relative to the third rail, with the second rail being mounted into a passage of the first rail along a second direction according to an embodiment of the present invention;

FIG. 24 is an enlarged view of an area A of FIG. 23;

FIG. 29 is a diagram showing the second rail of the slide rail assembly being moved relative to the first rail from the retracted position along the first direction, with an operating member adjacent to the blocking member at the first position according to an embodiment of the present invention;

FIG. 30 is an enlarged view of an area A of FIG. 29;

FIG. 31 is a diagram showing the second rail of the slide rail assembly being further moved relative to the first rail along the first direction, with the operating member being configured to press the blocking member to hold the blocking member at the second position according to an embodiment of the present invention;

FIG. 32 is an enlarged view of an area A of FIG. 31;

FIG. 33 is a diagram showing the second rail of the slide rail assembly being located at the extension position relative to the first rail according to an embodiment of the present invention;

FIG. 34 is an enlarged view of an area A of FIG. 33;

DETAILED DESCRIPTION

Figure 1:
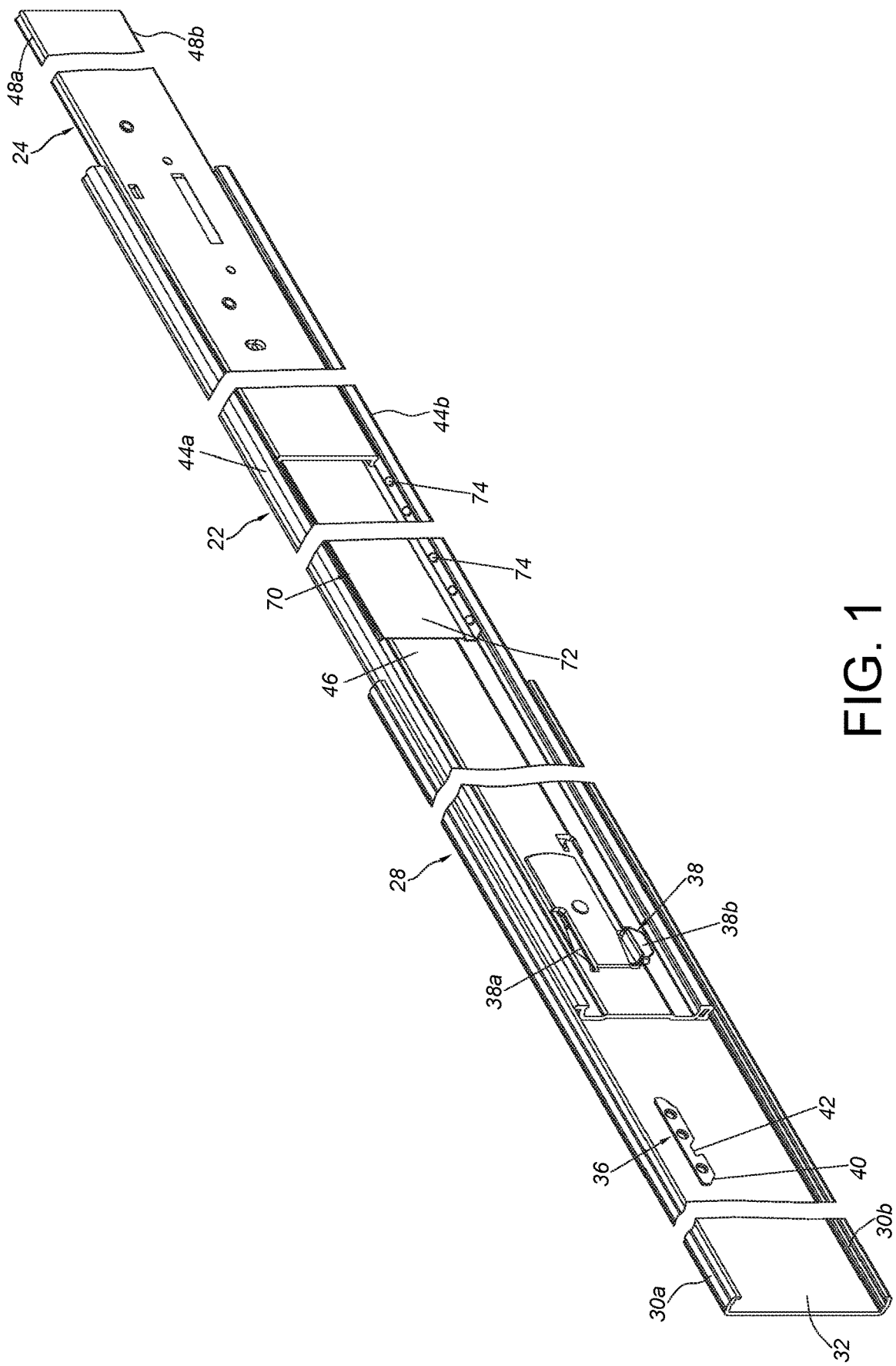
FIG. 1 is a diagram showing a slide rail assembly according to an embodiment of the present invention.
Figure 2:
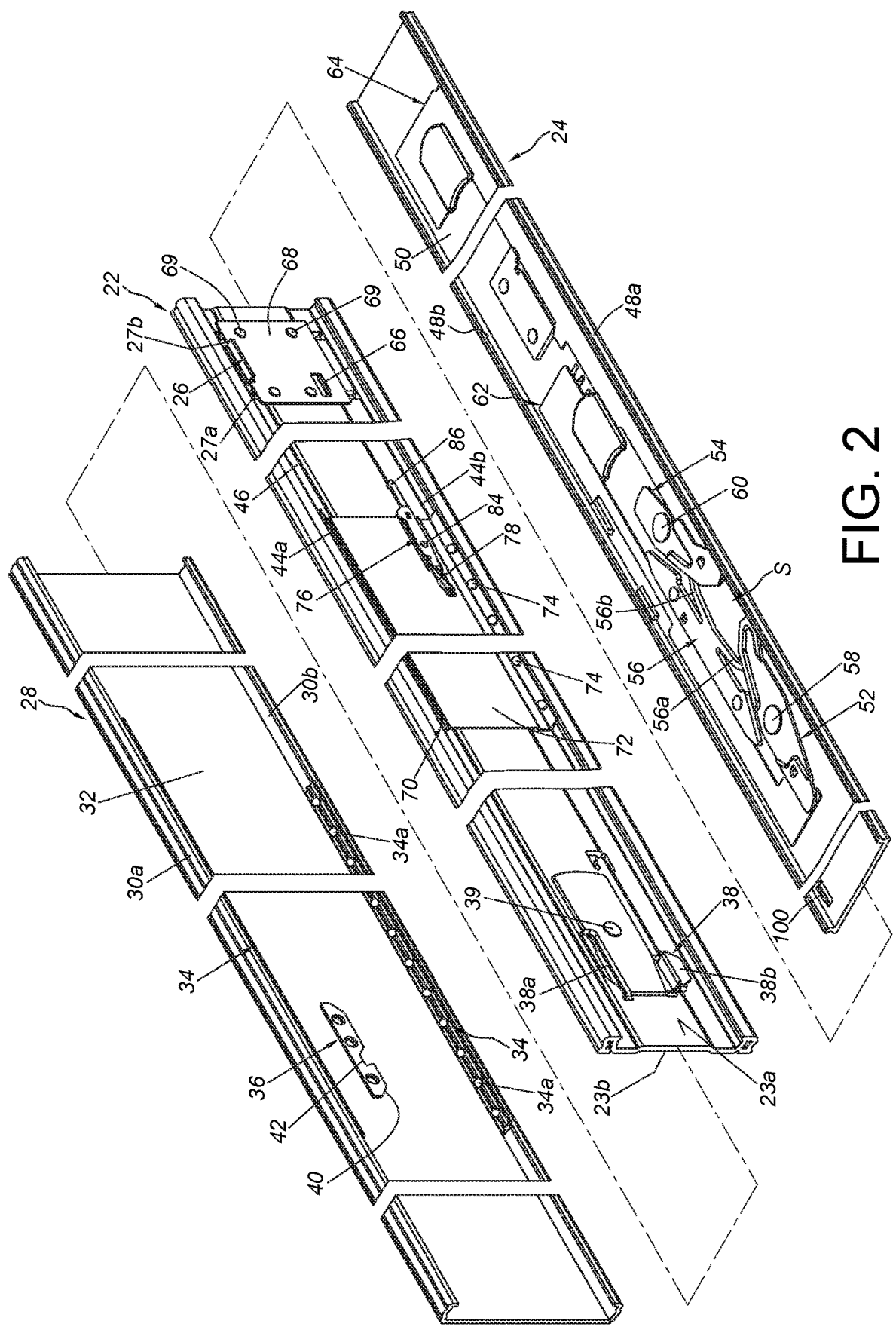
FIG. 2 is an exploded view of the slide rail assembly according to an embodiment of the present invention.

As shown in FIG. 1 and FIG. 2, a slide rail assembly comprises a first rail 22 (such as a middle rail), a second rail 24 (such as an inner rail) and a blocking member 26. Preferably, the slide rail assembly further comprises a third rail 28 (such as an outer rail).

The third rail 28 comprises a first wall 30a, a second wall 30b and a longitudinal wall 32 connected between the first wall 30a and the second wall 30b of the third rail 28. A passage is defined by the first wall 30a, the second wall 30b and the longitudinal wall 32 of the third rail 28 and configured to accommodate the first rail 22. Preferably, the slide rail assembly further comprises at least one slide assisting kit 34 movably mounted between the third rail 28 and the first rail 22 and configured to improve smoothness of relative movement between the third rail 28 and the first rail 22. The slide assisting kit 34 comprises a plurality of slide assisting members 34a rollingly contacting the third rail 28 and the first rail 22. Preferably, the longitudinal wall 32 of the third rail 28 is arranged with a functional member 36, and the first rail 22 is arranged with a synchronization member 38. Preferably, the synchronization member 38 is located adjacent to an end part (such as a rear end part) of the first rail 22. The synchronization member 38 is configured to interact with the functional member 36 to terminate synchronization relationship between the second rail 24 and the first rail 22. The functional member 36 comprises a guiding structure 40 and a positioning part 42. Preferably, the guiding structure 40 has an inclined surface or an arc surface, and the positioning part 42 has a groove or a recessed part. On the other hand, the synchronization member 38 is pivoted to the first rail 22 through a shaft member 39, and the synchronization member 38 comprises an elastic leg 38a and a synchronization structure 38b.

The first rail 22 is movably mounted between the third rail 28 and the second rail 24, and the first rail 22 is longitudinally movable relative to the third rail 28. The first rail 22 comprises a first wall 44a, a second wall 44b and a longitudinal wall 46 connected between the first wall 44a and the second wall 44b of the first rail 22. A passage is defined by the first wall 44a, the second wall 44b and the longitudinal wall 46 of the first rail 22 and configured to accommodate the second rail 24.

The blocking member 26 is movably arranged on the first rail 22. Preferably, the blocking member 26 is located adjacent to the other end part (such as a front end part) of the first rail 22.

The second rail 24 is longitudinally movable relative to the first rail 22. The second rail 24 comprises a first wall 48a, a second wall 48b and a longitudinal wall 50 connected between the first wall 48a and the second wall 48b of the second rail 24.

Preferably, the slide rail assembly further comprises a first working member 52, a second working member 54 and a base 56.

A space S is defined between the first working member 52 and the second working member 54 in a longitudinal direction. The first working member 52 is movably mounted to the second rail 24. In the present embodiment, the first working member 52 is pivoted to the longitudinal wall 50 of the second rail 24 through a first mounting member 58. On the other hand, the second working member 54 is movably mounted to the second rail 24. In the present embodiment, the second working member 54 is pivoted to the longitudinal wall 50 of the second rail 24 through a second mounting member 60. The base 56 comprises a first elastic part 56a and a second elastic part 56b configured to respectively provide elastic forces to the first working member 52 and the second working member 54, in order to hold the first working member 52 and the second working member 54 in a first working state.

Preferably, the slide rail assembly further comprises a first operating member 62 and a second operating member 64 operatively connected to the first working member 52 and the second working member 54 respectively.

Preferably, the first rail 22 is arranged with an engaging part 66 located adjacent to the front end part of the first rail 22. In the present embodiment, the engaging part 66 is formed on a connecting member 68, and the connecting member 68 is fixed to the longitudinal wall 46 of the first rail 22 through at least one fixing member 69. The engaging part 66 is transversely (laterally) protruded from the longitudinal wall 46 of the first rail 22. However, in other embodiments, the engaging part 66 can be integrally formed on the longitudinal wall 46 of the first rail 22. The present invention is not limited thereto.

Preferably, the slide rail assembly further comprises a slide assisting device 70 movably mounted between the first rail 22 and the second rail 24 and configured to improve smoothness of relative movement between the first rail 22 and the second rail 24. The slide assisting device 70 comprises a main body 72, a plurality of slide assisting members 74 and a fastening member 76. The plurality of slide assisting members 74 are arranged on the main body 72 and configured to rollingly contact the first rail 22 and the second rail 24. The fastening member 76 is movably mounted to the main body 72 of the slide assisting device 70.

Preferably, the fastening member 76 has an elastic feature 78. The elastic feature 78 can be an elastic armor a spring, but the present invention is not limited thereto. The elastic feature 78 is configured to provide an elastic force to the fastening member 76 in order to hold the fastening member 76 in a first predetermined state.

Figure 3:
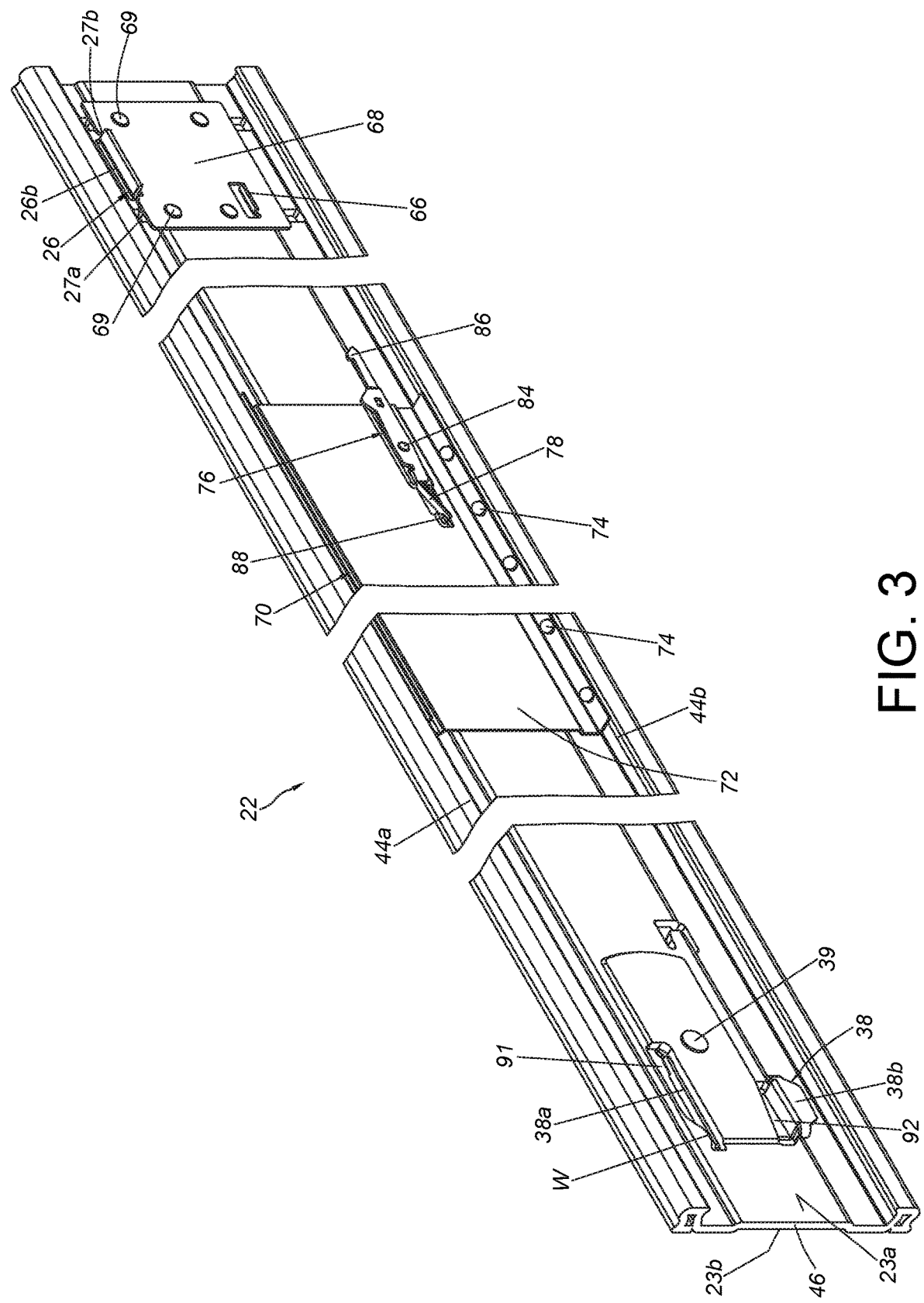
FIG. 3 is a diagram showing a first rail of the slide rail assembly from a first viewing angle according to an embodiment of the present invention.
Figure 4:
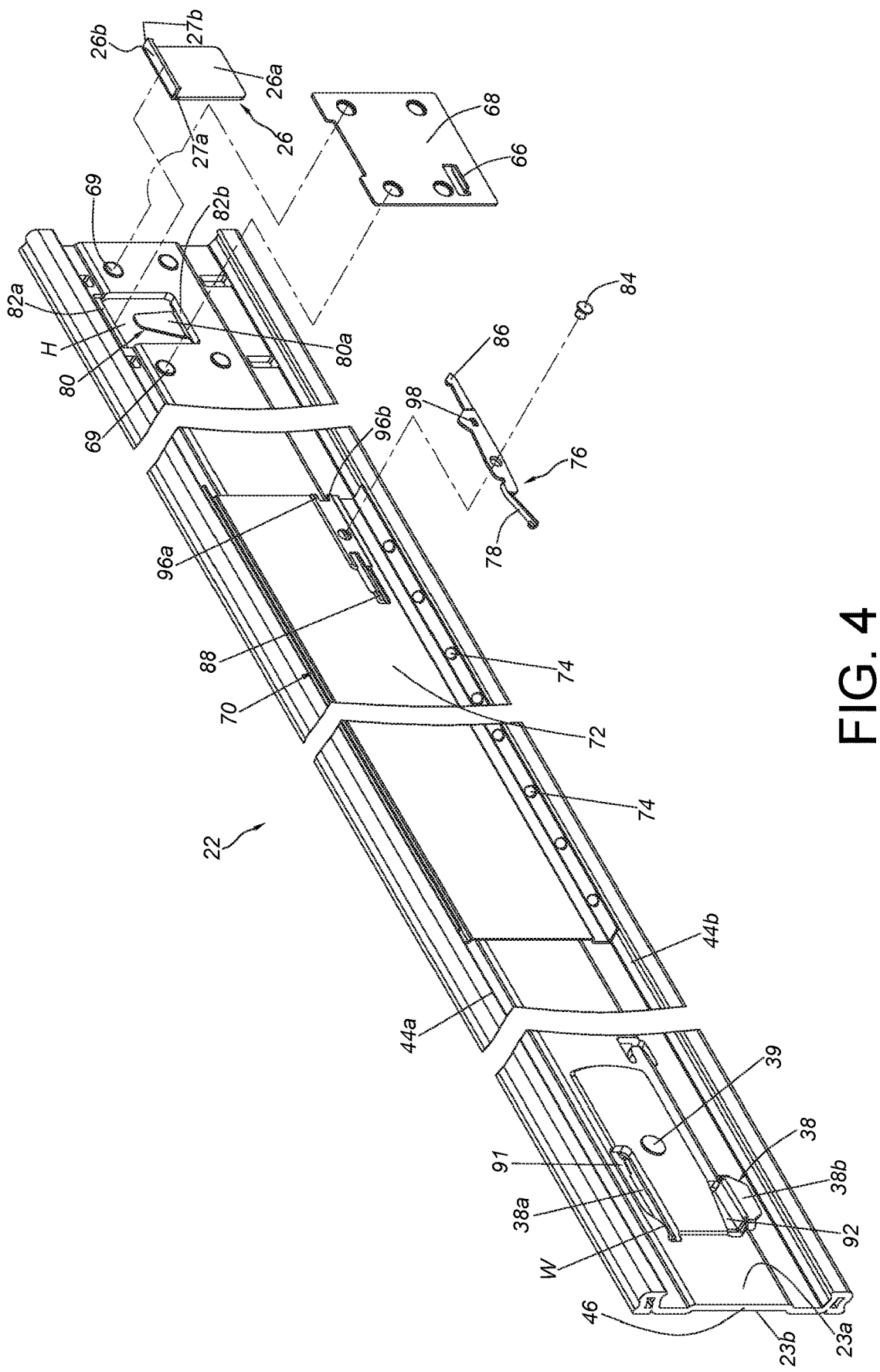
FIG. 4 is an exploded view of the first rail and related components of the slide rail assembly from the first viewing angle according to an embodiment of the present invention.
Figure 5:
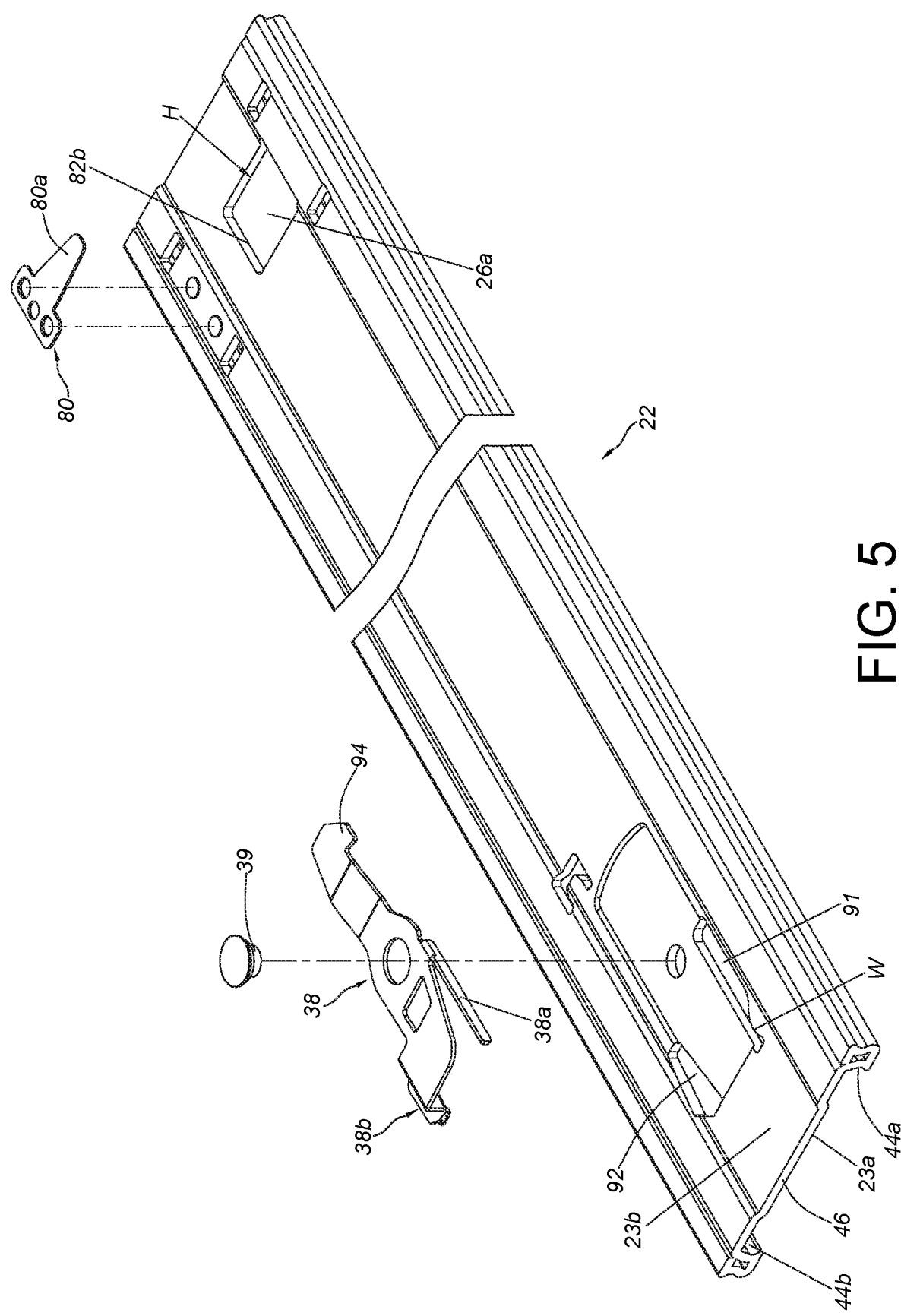
FIG. 5 is an exploded view of the first rail and the related components of the slide rail assembly from a second viewing angle according to an embodiment of the present invention.

As shown in FIG. 3, FIG. 4 and FIG. 5, the slide rail assembly further comprises an elastic member 80 configured to provide an elastic force to the blocking member 26. Preferably, the longitudinal wall 46 of the first rail 22 has a first side 23a and a second side 23b opposite to the first side 23a. The first side 23a of the longitudinal wall 46 of the first rail 22 is close to the second rail 24, and the second side 23b of the longitudinal wall 46 of the first rail 22 is close to the third rail 28. The first rail 22 has an opening H communicated with the first side 23a and the second side 23b of the first rail 22. Furthermore, the blocking member 26 is located at a position corresponding to the opening H. The blocking member 26 comprises a main body 26a and a blocking part 26b. The blocking part 26b is bent from the main body 26a. Preferably, the blocking part 26b is substantially perpendicularly connected to the main body 26a, and the blocking part 26b is transversely (laterally) protruded relative to the longitudinal wall 46 of the first rail 22 toward the first side 23a of the longitudinal wall 46 of the first rail 22.

Preferably, the opening H of the first rail 22 is surrounded by a plurality of walls, such as a first abutting wall 82a and a second abutting wall 82b. The first abutting wall 82a and the second abutting wall 82b are configured to support the blocking member 26 in order to hold the blocking member 26 at a predetermined mounting position.

Preferably, the connecting member 68 and the elastic member 80 are respectively arranged on the first side 23a and the second side 23b of the longitudinal wall 46 of the first rail 22. The elastic member 80 has an elastic section 80a located at a position corresponding to the opening H. Preferably, the main body 26a of the blocking member 26 is sandwiched between the connecting member 68 and the elastic section 80a of the elastic member 80. The elastic section 80a of the elastic member 80 is configured to provide an elastic force to the blocking member 26 to hold the blocking part 26b of the blocking member 26 to extend toward the first side 23a of the longitudinal wall 46 of the first rail 22.

Preferably, the fastening member 76 is pivoted to the main body 72 of the slide assisting device 70 through a pin member 84. Preferably, the fastening member 76 further comprises a fastening section 86, and the pin member 84 is located between the fastening section 86 and the elastic feature 78. The elastic feature 78 is configured to abut against a supporting structure 88 of the main body 72 of the slide assisting device 70. The supporting structure 88 can be a protrusion or a wall, but the present invention is not limited thereto.

Preferably, the first rail 22 further has a first hole 91 communicated with the first side 23a and the second side 23b of the first rail 22, and a second hole 92 communicated with the first side 23a and the second side 23b of the first rail 22. Furthermore, the synchronization member 38 is arranged on the second side 23b of the longitudinal wall 46 of the first rail 22 (as shown in FIG. 5), and the elastic leg 38a and the synchronization structure 38b of the synchronization member 38 are located at positions respectively corresponding to the first hole 91 and the second hole 92. Preferably, the elastic leg 38a of the synchronization member 38 is configured to abut against an inner wall W of the first hole 91, and the synchronization structure 38b of the synchronization member 38 is configured to pass through the second hole 92 to extend to the first side 23a of the longitudinal wall 46 of the first rail 22 (as shown in FIG. 3 and FIG. 4). Preferably, the synchronization member 38 further comprises an engaging section 94 (as shown in FIG. 5), and the shaft member 39 is located between the engaging section 94 and the synchronization structure 38b.

As shown in FIG. 6 and FIG. 7, the slide rail assembly is in a retracted state. The first rail 22 is retracted relative to the third rail 28, and the second rail 24 is located at a retraced position R relative to the first rail 22. Moreover, the first working member 52, the second working member 54, the base 56, the first operating member 62 and the second operating member 64 are omitted from FIG. 6.

The blocking member 26 is located adjacent to the front end part of the first rail 22. The fastening member 76 is spaced from the engaging part 66. The elastic feature 78 of the fastening member 76 is configured to abut against the supporting structure 88 of the slide assisting device 70, and the fastening member 76 can be held in the first predetermined state X1 by the elastic force of the elastic feature 78. Preferably, the slide assisting device 70 further comprises a first limiting part 96a and a second limiting part 96b (as shown in FIG. 7). On the other hand, the fastening member 76 further comprises a contact part 98. The contact part 98 can be a protrusion or an extension leg, but the present invention is not limited thereto. The contact part 98 of the fastening member 76 is located between the first limiting part 96a and the second limiting part 96b, such that the fastening member 76 can be rotated relative to the slide assisting device 70 within a limited range.

The synchronization member 38 is spaced from the functional member 36. The synchronization member 38 is configured to abut against the inner wall W of the first rail 22 through the elastic leg 38a to be held in an initial state Y1. Preferably, the second rail 24 has an auxiliary feature 100. The auxiliary feature 100 can be a protrusion, but the present invention is not limited thereto. When the synchronization member 38 is in the initial state Y1, the auxiliary feature 100 of the second rail 24 is configured to interact with the synchronization member 38.

As shown in FIG. 8 and FIG. 9, when the second rail 24 is moved relative to the first rail 22 from the retracted position R along a first direction D1, the second rail 24 abuts against the synchronization structure 38b of the synchronization member 38 in the initial state Y1 through the auxiliary feature 100, such that the second rail 24 can drive the first rail 22 to synchronously move along the first direction D1. When the first rail 22 and the second rail 24 are synchronously moved to a predetermined position, the engaging section 94 of the synchronization member 38 is configured to contact the guiding structure 40 of the functional member 36 of the third rail 28.

As shown in FIG. 10 and FIG. 11, when the second rail 24 and the first rail 22 are synchronously moved a predetermined distance relative to the third rail 28 along the first direction D1, the guiding structure 40 of the functional member 36 is configured to terminate synchronization relationship between the second rail 24 and the first rail 22.

Moreover, a working force is generated when the engaging section 94 of the synchronization member 38 contacts the guiding structure 40 of the functional member 36 of the third rail 28, such that the synchronization member 38 is rotated from the initial state Y1 to a non-initial state Y2 (such as being rotated from an initial position to another position) in response to the working force. In the meantime, the auxiliary feature 100 of the second rail 24 and the synchronization structure 38b of the synchronization member 38 are spaced from each other, in order to terminate synchronization relationship between the second rail 24 and the first rail 22. In addition, when the synchronization member 38 is in the non-initial state Y2, the elastic leg 38a accumulates an elastic force.

Figure 12:
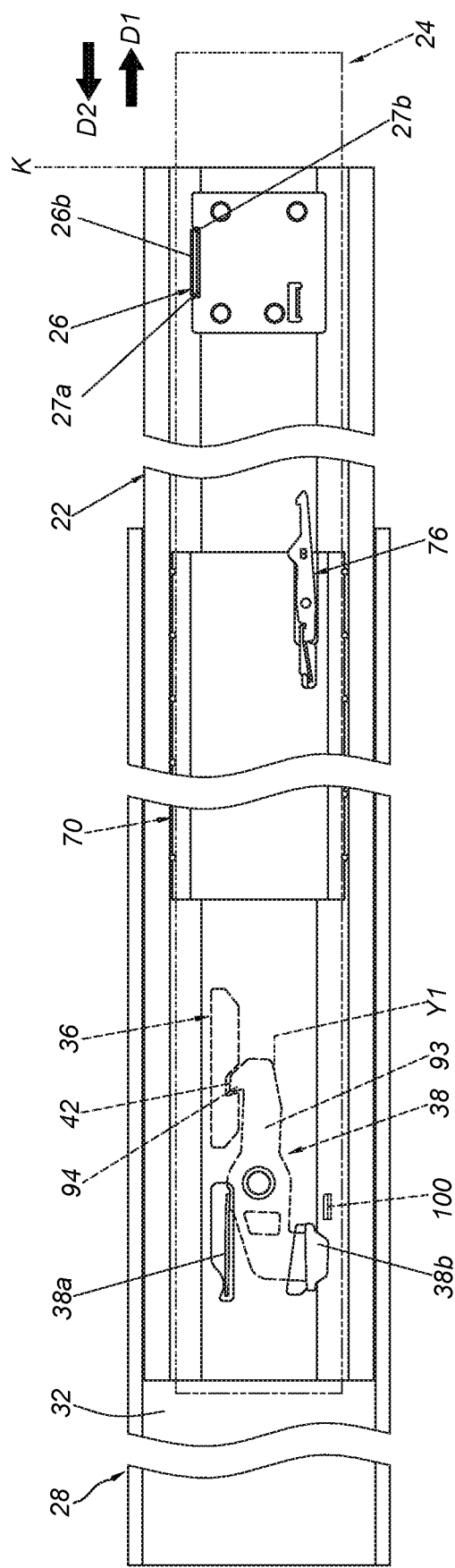
FIG. 12 is a diagram showing the first rail of the slide rail assembly being located at an open position relative to the third rail, with the second rail being moved relative to the first rail along the first direction according to an embodiment of the present invention.

As shown in FIG. 12, when the first rail 22 is moved relative to the third rail 28 along the first direction D1 to an open position K, the synchronization member 38 returns to the initial state Y1 from the non-initial state Y2 in response to the elastic force of the elastic leg 38a, such that the engaging section 94 of the synchronization member 38 is engaged with the positioning part 42 of the functional member 36 to hold the first rail 22 at the open position K, in order to prevent the first rail 22 from being moved from the open position K along the first direction D1 or along a second direction D2 opposite to the first direction D1.

As shown in FIG. 13, FIG. 14 and FIG. 15, when the first rail 22 is located at the open position K relative to the third rail 28, the second rail 24 can be further moved relative to the first rail 22 along the first direction D1. Moreover, when the second rail 24 is moved relative to the first rail 22 along the first direction D1, the slide assisting device 70 can also be moved along the first direction D1. The fastening member 76 can be held in the first predetermined state X1 by the elastic force of the elastic feature 78 (as shown in FIG. 14). In addition, the first working member 52 and the second working member 54 are configured to be respectively held in the first working state S1 in response to the elastic forces of the first elastic part 56a and the second elastic part 56b. Moreover, during a process of the second rail 24 being moved relative to the first rail 22 along the first direction D1, the second working member 54 of the second rail 24 is configured to contact a first end 27a of the blocking part 26b of the blocking member 26 of the first rail 22 (as shown in FIG. 15) to generate a working force.

In addition, as shown in FIG. 13 and FIG. 14, the fastening member 76 further comprises an auxiliary structure located between the pin member 84 and the fastening section 86, and the auxiliary structure has a first guiding section 87a and a second guiding section 87b at two sides. Each of the first guiding section 87a and the second guiding section 87b has an inclined surface or an arc surface. On the other hand, the base 56 further comprises a first contact part 57 and a second contact part 59. Each of the first contact part 57 and the second contact part 59 has an inclined surface or an arc surface, and the first contact part 57 and the second contact part 59 are configured to interact with the first guiding section 87a and the second guiding section 87b respectively. As such, during the process of the second rail 24 being moved relative to the first rail 22 along the first direction D1 or the second direction D2 opposite to the first direction D1, the base 56 can easily cross the fastening member 76. Moreover, during the process of the second rail 24 being moved relative to the first rail 22 along the first direction D1, the slide assisting device 70 is also moved along the first direction D1. The fastening member 76 is held in the first predetermined state X1 by the elastic force of the elastic feature 78, and the second guiding section 87b of the fastening member 76 is configured to contact the second contact part 59 of the base 56.

Figure 16:
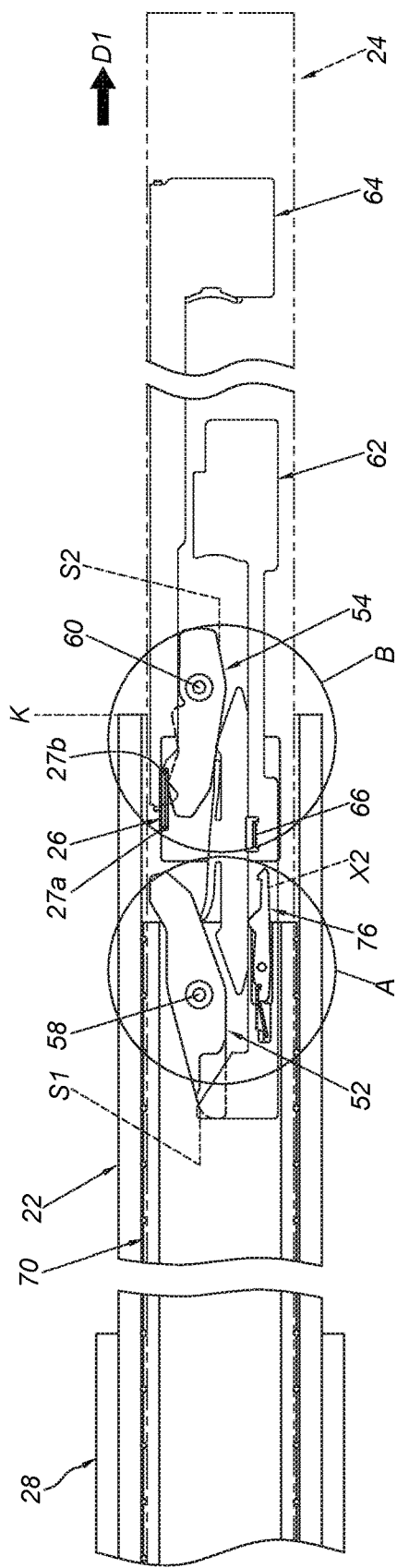
FIG. 16 is a diagram showing the first rail of the slide rail assembly being located at the open position relative to the third rail, with the second rail being further moved relative to the first rail along the first direction according to an embodiment of the present invention.
Figure 18:
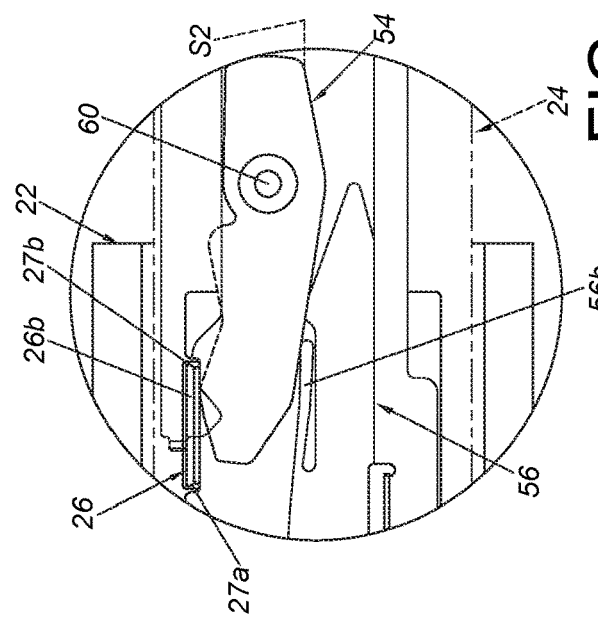
FIG. 18 is an enlarged view of an area B of FIG. 16.
Figure 17:
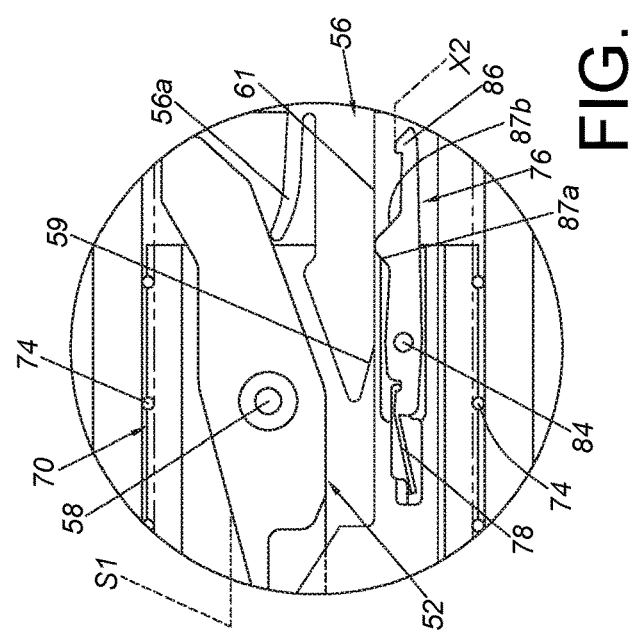
FIG. 17 is an enlarged view of an area A of FIG. 16.

As shown in FIG. 16, FIG. 17 and FIG. 18, during the process of the second rail 24 being further moved relative to the first rail 22 along the first direction D1, the second working member 54 of the second rail 24 is rotated to be no longer in the first working state S1 (such as switching from the first working state S1 to a second working state S2) due to the working force generated by the second working member 54 of the second rail 24 contacting the blocking member 26 of the first rail 22, such that the second working member 54 can cross the first end 27a of the blocking member 26. In the meantime, the second elastic part 56b accumulates an elastic force (as shown in FIG. 18). On the other hand, the first working member 52 is in the first working state S1 in response to the elastic force of the first elastic part 56a (as shown in FIG. 17).

In addition, as shown in FIG. 16 and FIG. 17, during the process of the second rail 24 being further moved relative to the first rail 22 along the first direction D1, the slide assisting device 70 is also moved along the first direction D1. The fastening member 76 contacts the second contact part 59 of the base 56 through the second guiding section 87b to generate a working force, such that the fastening member 76 is rotated to switch from the first predetermined state X1 to a second predetermined state X2. Moreover, a longitudinal section 61 of the base 56 is configured to abut against the auxiliary structure of the fastening member 76 to temporarily hold the fastening member 76 in the second predetermined state X2. In the meantime, the elastic feature 78 of the fastening member 76 accumulates an elastic force.

Figure 19:
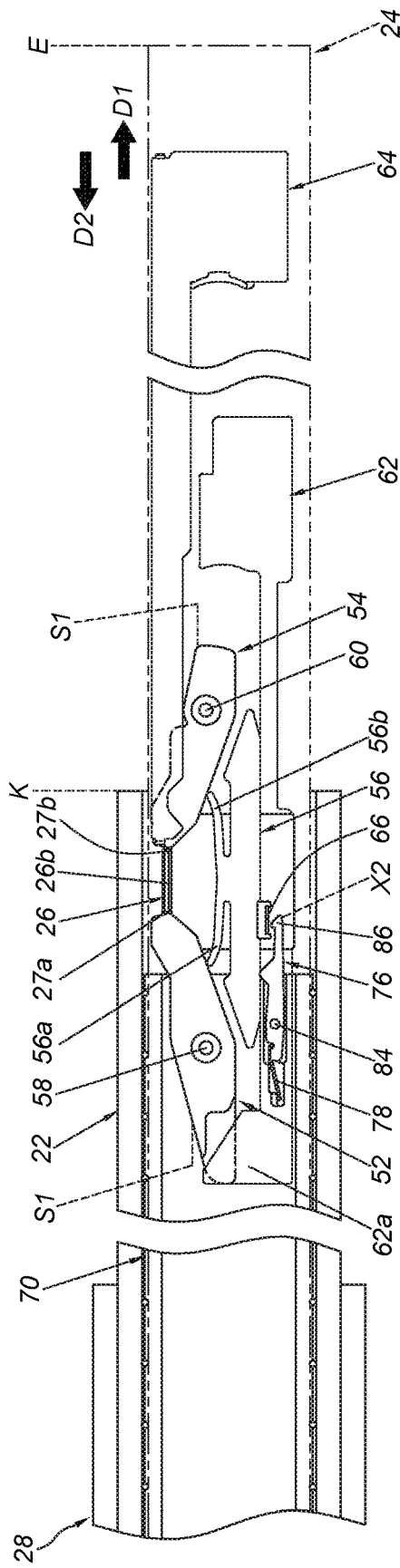
FIG. 19 is a diagram showing the slide rail assembly being in an extended state according to an embodiment of the present invention.

As shown in FIG. 19, when the second rail 24 is further moved relative to the first rail 22 along the first direction D1 to an extension position E, the second rail 24 is blocked by the blocking member 26.

For example, when the second rail 24 is moved to the extension position E, the second working member 54 returns to the first working state S1 from the second working state S2 in response to the elastic force of the second elastic part 56b. In the meantime, the second working member 54 is located adjacent to a second end 27b of the blocking member 26. On the other hand, the first working member 52 is in the first working state S1 and located adjacent to the first end 27a of the blocking member 26. In other words, the first working member 52 and the second working member 54 are respectively located adjacent to two opposite ends of the blocking member 26. According to such arrangement, the second rail 24 is configured to be blocked by the first end 27a of the blocking member 26 through the first working member 52 in the first working state S1, in order to prevent the second rail 24 from being moved from the extension position E along the first direction D1; and the second rail 24 is configured to be blocked by the second end 27b of the blocking member 26 through the second working member 54 in the first working state S1, in order to prevent the second rail 24 from being moved from the extension position E along the second direction D2. In the meantime, the slide rail assembly is in an extended state (such as being completely extended, but the present invention is not limited thereto). The first operating member 62 and the second operating member 64 are configured to be operated to respectively switch the first working member 52 and the second working member 54 from the first working state S1 to the second working state S2.

As shown in FIG. 19, when the second rail 24 is further moved relative to the first rail 22 along the first direction D1 to the extension position E, the slide assisting device 70 is also further moved along the first direction D1, and the fastening section 86 of the fastening member 76 in the second predetermined state X2 and the engaging part 66 of the first rail 22 are spaced from each other.

Figure 20:
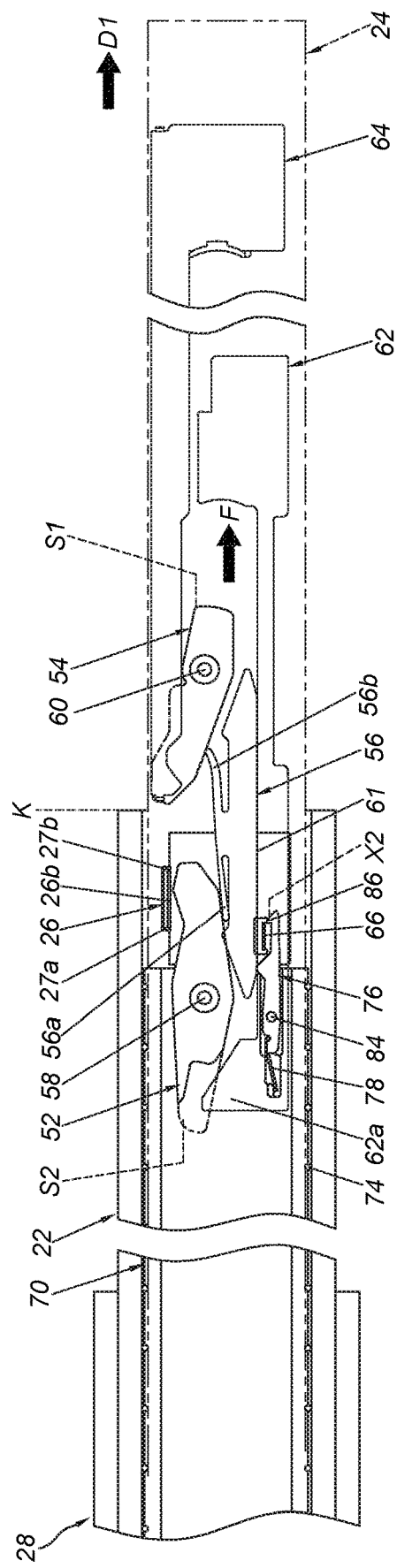
FIG. 20 is a diagram showing the first rail of the slide rail assembly being located at the open position relative to the third rail, with the second rail being moved relative to the first rail from an extension position along the first direction according to an embodiment of the present invention.

As shown in FIG. 19 and FIG. 20, when a user is going to move the second rail 24 relative to the first rail 22 from the extension position E along the first direction D1, the user can apply an operating force F to the first operating member 62 (as shown in FIG. 20) to drive a driving part 62a of the first operating member 62 to switch the first working member 52 from the first working state S1 to the second working state S2, such that the second rail 24 is no longer blocked by the first end 27a of the blocking part 26b of the blocking member 26, and the second rail 24 can be further moved from the extension position E along the first direction D1.

Moreover, as shown in FIG. 20, when the second rail 24 is moved relative to the first rail 22 from the extension position E along the first direction D1, the slide assisting device 70 is also moved along the first direction D1, and the fastening section 86 of the fastening member 76 in the second predetermined state X2 can cross the engaging part 66 of the first rail 22.

As shown in FIG. 21 and FIG. 22, when the second rail 24 is moved from the extension position E along the first direction D1, the second rail 24 can be detached from the passage of the first rail 22. During the process of the second rail 24 being moved relative to the first rail 22 from the extension position E along the first direction D1, the slide assisting device 70 is also moved along the first direction D1, and the longitudinal section 61 of the base 56 no longer abuts against the auxiliary structure of the fastening member 76, such that the fastening member 76 is configured to return to the first predetermined state X1 in response to the elastic force of the elastic feature 78, so as to allow the fastening section 86 of the fastening member 76 to be engaged with the engaging part 66 of the first rail 22. Preferably, the engaging part 66 of the first rail 22 is located between the fastening section 86 and the auxiliary structure of the fastening member 76. According to such arrangement, the slide assisting device 70 can be temporarily held at such position.

As shown in FIG. 23 and FIG. 24, after the second rail 24 is detached from the first rail 22 (please refer to FIG. 21), the second rail 24 is configured to drive the fastening member 76 to detach from the engaging part 66 of the first rail 22 through a guiding feature during a process of the second rail 24 being moved along the second direction D2 to be mounted into the passage of the first rail 22. Specifically, the second contact part 59 of the base 56 is used as the guiding feature. The second rail 24 pushes the second guiding section 87b of the fastening member 76 through the second contact part 59 of the base 56 to move the fastening member 76 to be no longer in the first predetermined state X1 (i.e. the fastening member 76 is switched from the first predetermined state X1 to the second predetermined state X2), such that the fastening member 76 can be detached from the engaging part 66 of the first rail 22 to allow the slide assisting device 70 to move with the second rail 24 along the second direction D2.

Figure 25:
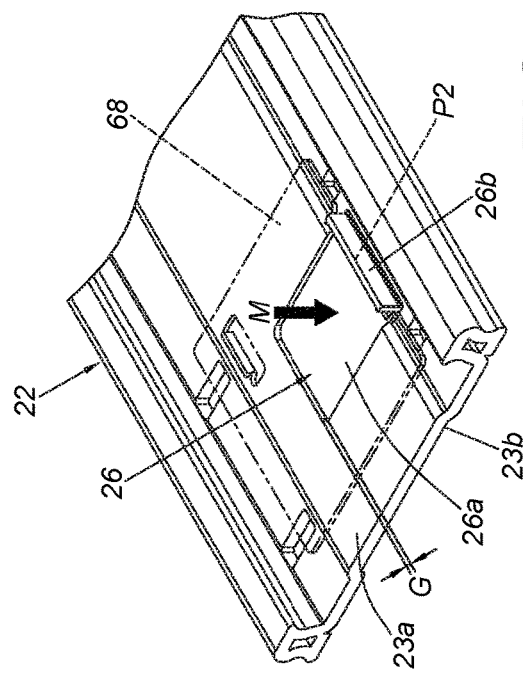
FIG. 25 is a diagram showing a blocking member of the first rail being located at a first position according to an embodiment of the present invention.
Figure 26:
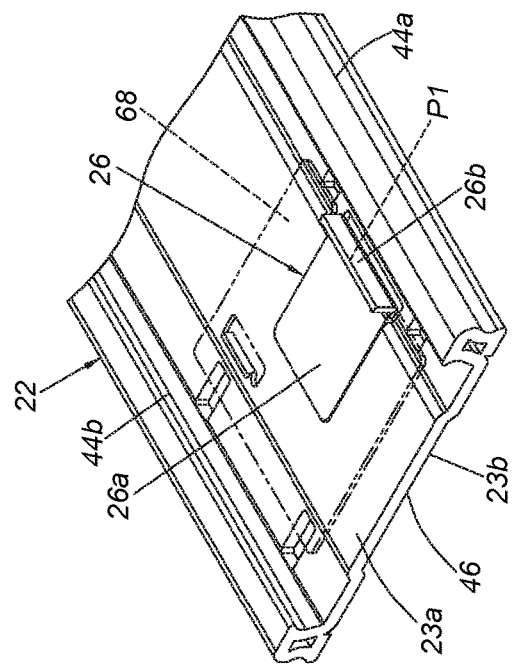
FIG. 26 is a diagram showing an elastic member providing an elastic force to the blocking member to hold the blocking member at the first position according to an embodiment of the present invention.

As shown in FIG. 25 and FIG. 26, the blocking member 26 is configured to be held at a first position P1 through the elastic force of the elastic member 80. The connecting member 68 is arranged on the first side 23a of the longitudinal wall 46 of the first rail 22 (as shown in FIG. 25), and the elastic member 80 is arranged on the second side 23b of the longitudinal wall 46 of the first rail 22 (as show in FIG. 26). Preferably, the main body 26a of the blocking member 26 is sandwiched between the connecting member 68 and the elastic section 80a of the elastic member 80. The blocking member 26 is configured to be held at the first position P1 through the elastic force of the elastic section 80a of the elastic member 80.

Figure 27:
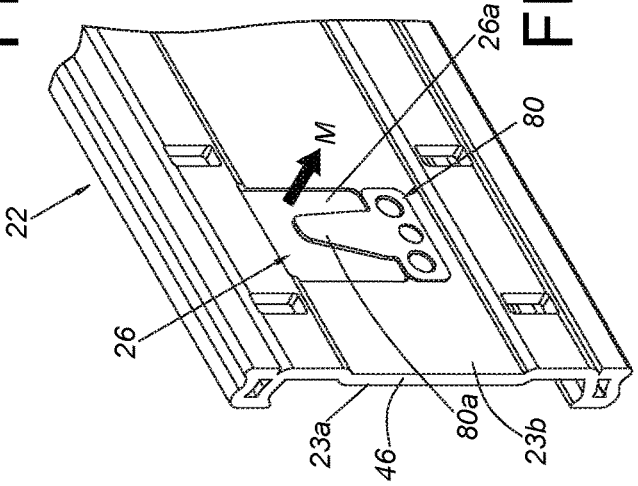
FIG. 27 is a diagram showing the blocking member of the first rail being located at a second position according to an embodiment of the present invention.
Figure 28:
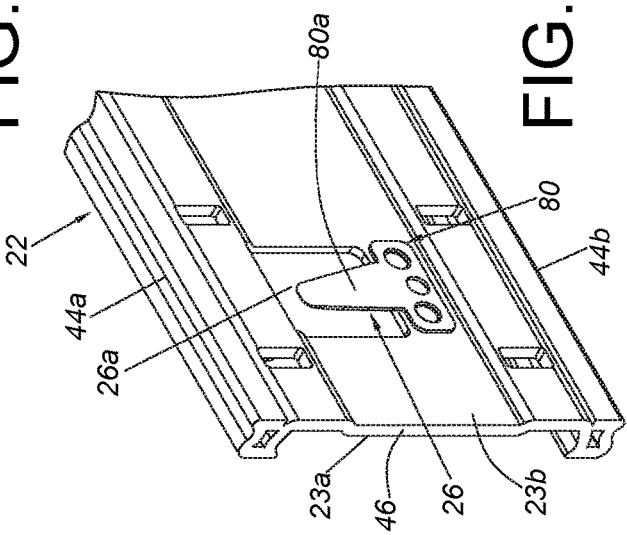
FIG. 28 is a diagram showing the elastic member accumulating an elastic force in response to the blocking member of the first rail being located at the second position according to an embodiment of the present invention.

As shown in FIG. 27 and FIG. 28, the blocking member 26 is movable relative to the first rail 22. For example, when a force M is applied to the blocking member 26, the blocking member 26 is transversely (laterally) moved a distance G from the first position P1 to a second position P2 (as shown in FIG. 27). In the meantime, the elastic section 80a of the elastic member 80 is slightly deformed to accumulate an elastic force (as shown in FIG. 28).

As shown in FIG. 29 to FIG. 32, the second operating member 64 comprises a first pushing feature 64a and a second pushing feature 64b. Preferably, each of the first pushing feature 64a and the second pushing feature 64b has an inclined surface or an arc surface, and the first pushing feature 64*a* and the second pushing feature 64*b* are respectively arranged at two end parts of the second operating member 64.

Moreover, during the process of the second rail 24 being moved relative to the first rail 22 from the retracted R along the first direction D1, the second operating member 64 is configured to press the blocking member 26 to apply the force M through the first pushing feature 64*a* to move the blocking member 26 from the first position P1 (as shown in FIG. 30) to the second position P2 (as shown in FIG. 32). In the meantime, the elastic section 80*a* of the elastic member 80 is elastically deformed to accumulate an elastic force.

As shown in FIG. 33 and FIG. 34, when the second rail 24 is moved relative to the first rail 22 along the first direction D1 to the extension position E, the first working member 52 and the second working member 54 are respectively located adjacent to two ends of the blocking member 26 (pleaser refer to FIG. 19). In the meantime, the blocking part 26*b* of the blocking member 26 is located at a position corresponding to the space S defined between the first working member 52 and the second working member 54, such that the blocking member 26 returns to the first position P1 in response to the elastic force of the elastic section 80*a* of the elastic member 80.

Moreover, the elastic member 80 provides the elastic force to the blocking member 26 to transversely push the blocking member 26 toward the longitudinal wall 50 of the second rail 24. According to such arrangement, the blocking member 26 can be transversely lifted and held at the first position P1 through the elastic force of the elastic member 80, such that the blocking member 26 can have a greater transverse height T1 to be as close to the longitudinal wall 50 of the second rail 24 as possible (for example, the transverse height T1 of the blocking member 26 at the first position P1 is greater than one and a half of a thickness T2 of the working member 52 or 54, but the present invention is not limited thereto, the blocking member 26 is required to be as close to the longitudinal wall 50 of the second rail 24 as possible through the elastic force of the elastic member 80). Therefore, reliability of the blocking part 26*b* of the blocking member 26 being engaged between the first and second working members 52, 54 can be improved, so as to assist in holding the second rail 24 at the extension position E relative to the first rail 22. In addition, a limited transverse space defined between the longitudinal wall 46 of the first rail 22 and the longitudinal wall 50 of the second rail 24 of the slide rail assembly can also help the blocking member 26 of the first rail 22 to be as close to the longitudinal wall 50 of the second rail 24 as possible, such that the blocking member 26 can be more effectively engaged between the first and second working members 52, 54.

Figure 35:
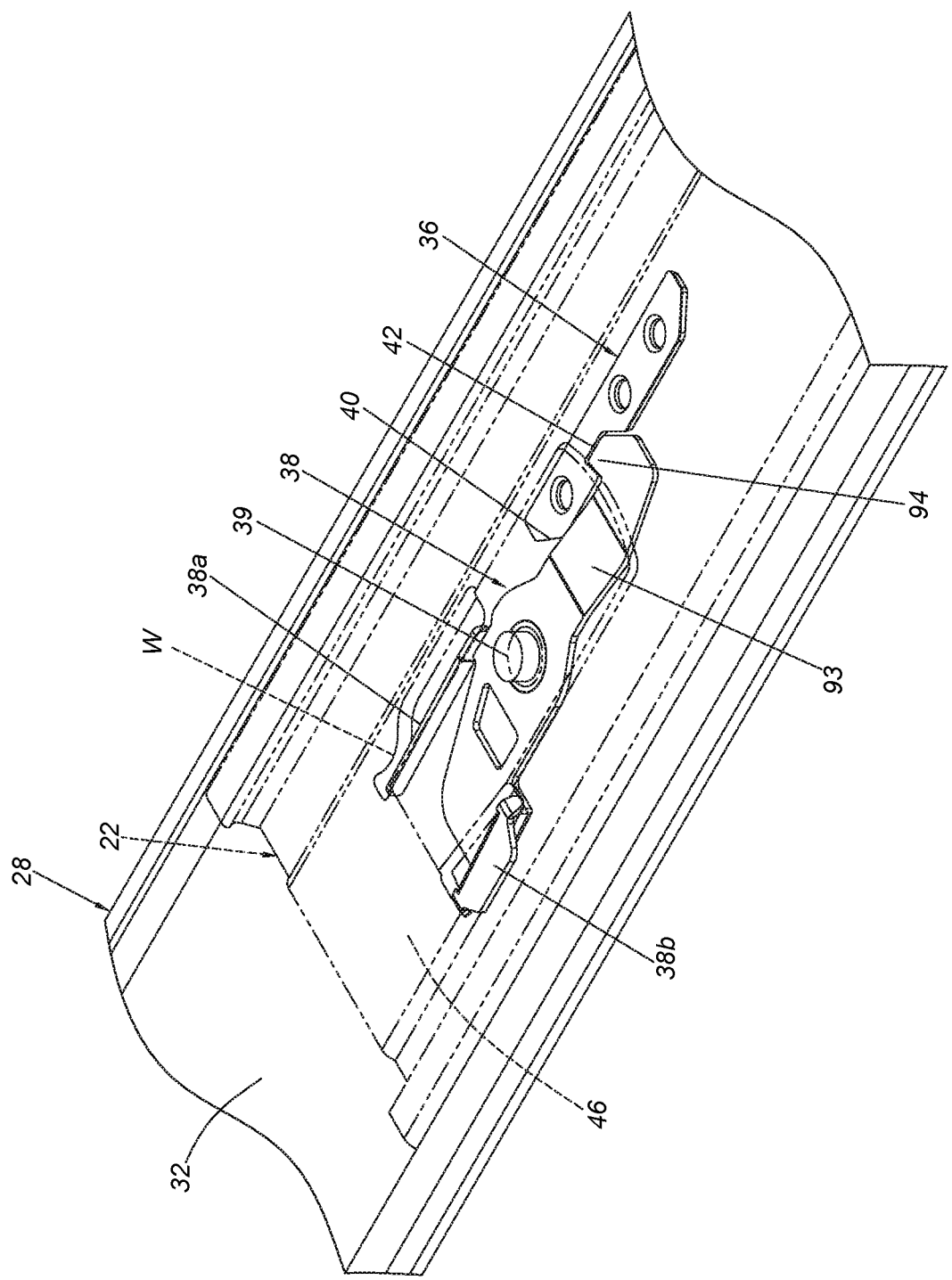
FIG. 35 is a diagram showing a synchronization member of the first rail of the slide rail assembly being configured to be engaged with a functional member of the third rail according to an embodiment of the present invention.
Figure 36:
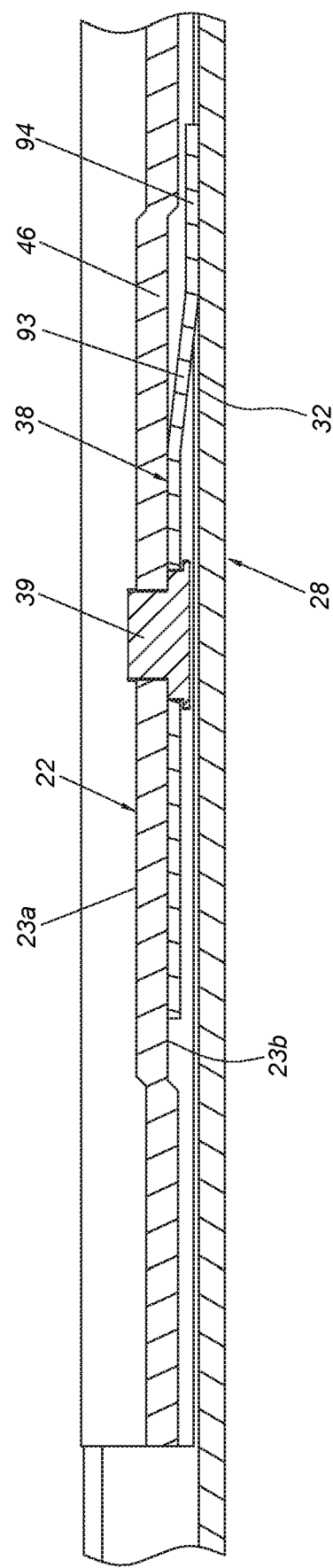
FIG. 36 is a diagram showing a portion of the synchronization member of the first rail of the slide rail assembly being elastically extended toward the third rail according to an embodiment of the present invention.

As shown in FIG. 35 and FIG. 36, the synchronization member 38 is in the initial state Y1 in response to the elastic force released by the elastic leg 38*a* (please refer to FIG. 12), to allow the engaging section 94 of the synchronization member 38 to be engaged with the positioning part 42 of the functional member 36. Moreover, the synchronization member 38 can be made of a flexible material, and the engaging section 94 of the synchronization member 38 is elastically extended toward the longitudinal wall 32 of the third rail 28. Preferably, the synchronization member 38 has a flexible arm 93 tilted toward the longitudinal wall 32 of the third rail 28, and the engaging section 94 is arranged on the flexible arm 93. The engaging section 94 of the synchronization member 38 is configured to be close to or attached to the longitudinal wall 32 of the third rail 28 with assist of the flexible arm 93, in order to improve the engaging reliability between the engaging section 94 of the synchronization member 38 and the positioning part 42 of the functional member 36. In addition, a limited transverse space defined between the longitudinal wall 46 of the first rail 22 and the longitudinal wall 32 of the third rail 28 of the slide rail assembly can also help the engaging section 94 of the synchronization member 38 of the first rail 22 to be as close to the longitudinal wall 32 of the third rail 28 as possible, such that the engaging section 94 of the synchronization member 38 can be more effectively engaged with the positioning part 42 of the functional member 36. Moreover, the functional member 36 is omitted from FIG. 36.

Therefore, the slide rail assembly according to the embodiments of the present invention is characterized in that:

1. The slide assisting device 70 can be engaged with the engaging part 66 of the first rail 22 through the fastening member 76, such that the slide assisting device 70 can be held at one position. The fastening member 76 is movably mounted to the slide assisting device 70.

2. The blocking member 26 is movably arranged on the first rail 22 (such as the middle rail). When the second rail 24 is moved relative to the first rail 22 from the retracted position R to the extension position E along the first direction D1, the second rail 24 is blocked by the blocking member 26. Such arrangement can meet different requirements of the market, especially for an ultra-thin slide rail assembly.

3. With the elastic force of the elastic member 80, the blocking member 26 can have the greater transverse height T1 to be as close to the second rail 24 as possible, such that the reliability of the blocking member 26 being engaged between the first and second working members 52, 54 can be improved to assist in holding the second rail 24 at the extension position E relative to the first rail 22.

4. The engaging section 94 of the synchronization member 38 is configured to be elastically extended toward the longitudinal wall 32 of the third rail 28 to improve the engaging reliability between the engaging section 94 and the positioning part 42 of the functional member 36.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide rail assembly, comprising:
    a first rail arranged with an engaging part;
    a second rail movable relative to the first rail;
    a slide assisting device movably mounted between the first rail and the second rail, wherein the slide assisting device comprises a main body, a plurality of slide assisting members and a fastening member, the plurality of slide assisting members are arranged on the main body and configured to rollingly contact the first rail and the second rail, and the fastening member is movably mounted to the main body;
    a blocking member movably arranged on the first rail;
    an elastic member configured to provide an elastic force to the blocking member; and
    a first working member movably mounted to the second rail;
    wherein the second rail is movable relative to the first rail from a retracted position to an extension position along a first direction;

wherein when the second rail is moved from the extension position along the first direction, the slide assisting device is configured to be engaged with the engaging part of the first rail through the fastening member being in a predetermined state; and wherein when the second rail is located at the extension position relative to the first rail, the second rail is blocked by the blocking member through the first working member being in a first working state, in order to prevent the second rail from being moved along the first direction.

2. The slide rail assembly of claim 1, further comprising an elastic feature configured to provide an elastic force to the fastening member in order to hold the fastening member in the predetermined state.

3. The slide rail assembly of claim 1, wherein the fastening member is pivoted to the main body of the slide assisting device.

4. The slide rail assembly of claim 1, wherein after the second rail is moved from the extension position along the first direction to be detached from the first rail, the second rail is configured to drive the fastening member to detach from the engaging part of the first rail through a guiding feature during a process of the second rail being moved along a second direction opposite to the first direction to be mounted into the first rail.

5. The slide rail assembly of claim 1, wherein the first working member is pivoted to the second rail.

6. The slide rail assembly of claim 5, further comprising a second working member movably mounted to the second rail; wherein when the second rail is located at the extension position, the second rail is blocked by the blocking member through the second working member being in the first working state, in order to prevent the second rail from being moved along a second direction opposite to the first direction.

7. The slide rail assembly of claim 6, wherein the second working member is pivoted to the second rail.

8. The slide rail assembly of claim 7, further comprising a first elastic part and a second elastic part configured to provide elastic forces to the first working member and the second working member respectively in order to hold the first working member and the second working member in the first working state.

9. The slide rail assembly of claim 8, further comprising a first operating member and a second operating member configured to be operated to respectively switch the first working member and the second working member from the first working state to a second working state.

10. The slide rail assembly of claim 1, further comprising a third rail, wherein the first rail is movably mounted between the third rail and the second rail.

11. The slide rail assembly of claim 10, further comprising a slide assisting kit movably mounted between the third rail and the first rail.

12. The slide rail assembly of claim 11, wherein the slide assisting kit comprises a plurality of slide assisting members rollingly contacting the third rail and the first rail.

13. A slide rail assembly, comprising:
a first rail arranged with an engaging part;
a second rail movable relative to the first rail;
a third rail, wherein the first rail is movably mounted between the third rail and the second rail; and
a slide assisting device movably mounted between the first rail and the second rail, wherein the slide assisting device comprises a main body a plurality of slide assisting members and a fastening member, the plurality of slide assisting members are arranged on the main body and configured to rollingly contact the first rail and the second rail, and the fastening member is movably mounted to the main body;
wherein the second rail is movable relative to the first rail from a retracted position to an extension position along a first direction;
wherein when the second rail is moved from the extension position along the first direction, the slide assisting device is configured to be engaged with the engaging part of the first rail through the fastening member being in a predetermined state; and
wherein the third rail is arranged with a functional member, and the first rail is arranged with a synchronization member; wherein when the second rail is moved relative to the first rail from the retracted position along the first direction, the second rail is configured to drive the first rail to synchronously move along the first direction through the synchronization member; wherein a guiding structure of the functional member is configured to move the synchronization member to allow the first rail to be no longer synchronously moved with the second rail when the second rail is moved a predetermined distance from the retracted position along the first direction.

14. The slide rail assembly of claim 13, wherein the synchronization member is made of a flexible material.

15. The slide rail assembly of claim 14, wherein the functional member comprises a positioning part, and the synchronization member comprises an engaging section elastically extended toward the third rail; wherein when the first rail is moved relative to the third rail along the first direction to an open position, the first rail is configured to be engaged with the positioning part of the functional member through the engaging section of the synchronization member, in order to hold the first rail at the open position.

16. The slide rail assembly of claim 14, wherein the synchronization member is pivoted to the first rail.

17. The slide rail assembly of claim 16, wherein the synchronization member comprises an elastic leg abutting against the first rail.

* * * * *